United States Patent
Sekiya et al.

(10) Patent No.: US 9,991,024 B2
(45) Date of Patent: *Jun. 5, 2018

(54) ALUMINUM ALLOY WIRE ROD, ALUMINUM ALLOY STRANDED WIRE, COATED WIRE, WIRE HARNESS AND MANUFACTURING METHOD OF ALUMINUM ALLOY WIRE ROD

(71) Applicants: FURUKAWA ELECTRIC CO., LTD., Tokyo (JP); FURUKAWA AUTOMOTIVE SYSTEMS INC., Inukami-gun, Shiga (JP)

(72) Inventors: Shigeki Sekiya, Tokyo (JP); Sho Yoshida, Tokyo (JP); Kyota Susai, Tokyo (JP); Kengo Mitose, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/483,013

(22) Filed: Apr. 10, 2017

(65) Prior Publication Data

US 2017/0213619 A1 Jul. 27, 2017

Related U.S. Application Data

(63) Continuation-in-part of application No. 15/073,204, filed on Mar. 17, 2016, now Pat. No. 9,650,706, which is a continuation-in-part of application No. 14/681,742, filed on Apr. 8, 2015, now Pat. No.
(Continued)

(30) Foreign Application Priority Data

Mar. 29, 2013 (JP) ................. 2013-075403

(51) Int. Cl.
| | |
|---|---|
| H01B 7/00 | (2006.01) |
| H01B 5/08 | (2006.01) |
| C22C 21/04 | (2006.01) |
| C22C 21/06 | (2006.01) |
| C22C 21/08 | (2006.01) |
| C22C 21/16 | (2006.01) |
| C22C 21/14 | (2006.01) |
| C22C 21/02 | (2006.01) |
| C22F 1/057 | (2006.01) |
| C22F 1/05 | (2006.01) |
| C22F 1/047 | (2006.01) |
| C22F 1/043 | (2006.01) |
| B22D 21/00 | (2006.01) |
| B22D 11/00 | (2006.01) |
| B22D 11/06 | (2006.01) |
| H01B 1/02 | (2006.01) |

(Continued)

(52) U.S. Cl.
CPC ............. *H01B 7/0045* (2013.01); *B21C 1/02* (2013.01); *B22D 11/003* (2013.01); *B22D 11/0602* (2013.01); *B22D 21/007* (2013.01); *C22C 21/02* (2013.01); *C22C 21/08* (2013.01); *C22C 21/14* (2013.01); *C22C 21/16* (2013.01); *C22F 1/043* (2013.01); *C22F 1/047* (2013.01); *C22F 1/05* (2013.01); *C22F 1/057* (2013.01); *H01B 1/023* (2013.01); *H01B 13/0016* (2013.01)

(58) Field of Classification Search
CPC .. H01B 1/02; H01B 1/023; H01B 5/02; C22C 21/00; C22C 21/02; C22C 21/08; C22C 21/14
USPC ........ 174/72 A, 110 R, 128.1; 420/544, 546, 420/535; 428/544
See application file for complete search history.

(56) References Cited

U.S. PATENT DOCUMENTS 3,843,418 A * 10/1974 Oida et al. ............. C22C 21/08
148/415
4,042,424 A * 8/1977 Nicoud ................... C22C 21/08
148/417
(Continued)

FOREIGN PATENT DOCUMENTS

| CN | 101121978 A | 2/2008 |
|---|---|---|
| CN | 101536112 A | 9/2009 |

(Continued)

OTHER PUBLICATIONS

Chinese Decision to Grant for Chinese Application No. 201380053482.0, dated Mar. 31, 2017, with English translation.
Decision to Grant a Patent of Japanese Patent Application No. 2014-508615, dated Aug. 11, 2014.
International Search Report, dated Feb. 4, 2014, issued in PCT/JP2013/080955.
Notification of Reasons for Refusal of Japanese Patent Application No. 2014-508615, dated May 19, 2014.
(Continued)

*Primary Examiner* — Timothy Thompson
*Assistant Examiner* — Rhadames J Alonzo Miller
(74) *Attorney, Agent, or Firm* — Birch, Stewart, Kolasch & Birch, LLP

(57) ABSTRACT

An aluminum alloy wire rod comprising 0.1-1.0 mass % Mg; 0.1-1.0 mass % Si; 0.01-1.40 mass % Fe; 0.01-0.50 mass % Zr; 0.000-0.100 mass % Ti; 0.000-0.030 mass % B; 0.00-1.00 mass % Cu; 0.00-0.50 mass % Ag; 0.00-0.50 mass % Au; 0.00-1.00 mass % Mn; 0.00-1.00 mass % Cr; 0.00-0.50 mass % Hf; 0.00-0.50 mass % V; 0.00-0.50 mass % Sc; 0.00-0.50 mass % Co; and 0.00-0.50 mass % Ni, a Mg/Si ratio being greater than 1, wherein a dispersion density of an $Mg_2Si$ compound having a particle size of 0.5 μm to 5.0 μm is less than or equal to $3.0 \times 10^{-3}$ particles/μm², and in the sectional structure, a concentration of each of Mg and Si other than a compound is less than or equal to 2.00 mass %.

15 Claims, No Drawings

Related U.S. Application Data 9,324,471, which is a continuation of application No. PCT/JP2013/080955, filed on Nov. 15, 2013.

(51) Int. Cl.
*H01B 13/00* (2006.01)
*B21C 1/02* (2006.01)

(56) References Cited

U.S. PATENT DOCUMENTS

| | | | | |
|---|---|---|---|---|
| 2003/0143102 | A1* | 7/2003 | Matsuoka | C22C 21/04 420/546 |
| 2006/0013719 | A1* | 1/2006 | Ichikawa | C22C 21/10 419/29 |
| 2007/0221396 | A1* | 9/2007 | Izumida | C21D 8/06 174/128.1 |
| 2008/0196923 | A1* | 8/2008 | Susai | H01B 1/023 174/110 R |
| 2009/0087341 | A1 | 4/2009 | Cai | |
| 2010/0059151 | A1* | 3/2010 | Iwamura | C22C 21/12 148/690 |
| 2010/0071933 | A1* | 3/2010 | Otsuka | C21D 9/60 174/128.1 |
| 2011/0132659 | A1* | 6/2011 | Kusakari | B21C 1/00 174/72 A |
| 2011/0268604 | A1 | 11/2011 | Cai | |
| 2012/0118607 | A1* | 5/2012 | Ishibashi | C22C 21/00 174/126.1 |
| 2013/0126055 | A1 | 5/2013 | Sekiya et al. | |
| 2013/0264115 | A1* | 10/2013 | Kobayashi | H01B 1/023 174/72 A |
| 2014/0020796 | A1 | 1/2014 | Sekiya et al. | |

FOREIGN PATENT DOCUMENTS

| | | |
|---|---|---|
| CN | 102051562 A | 5/2011 |
| EP | 2692880 A1 | 2/2014 |
| JP | 59-47365 A | 3/1984 |
| JP | 2010-265509 A | 11/2010 |
| JP | 2012-229485 A | 11/2012 |
| WO | WO 2012/011447 A1 | 1/2012 |
| WO | WO 2012/133634 A1 | 10/2012 |

OTHER PUBLICATIONS

Written Opinion of the International Searching Authority, dated Feb. 4, 2014, issued in PCT/JP2013/080955.
Chinese Office Action and Search Report for Chinese Application No. 201380053482.0, dated Aug. 26, 2016, with and English translation thereof.
Extended European Search Report for counterpart European Application No. 13879835.0, dated Jul. 4, 2016.
International Preliminary Report on Patentability and Written Opinion of the International Searching Authority (Forms PCT/IB/373 and PCT/ISA/237) for International Application No. PCT/JP2013/080955, dated Sep. 29, 2015, with an English translation.
Non-Final Office Action dated Jun. 17, 2016, issued in U.S. Appl. No. 15/073,204.
Notice of Allowability dated Dec. 16, 2015 issued in U.S. Appl. No. 14/681,742.
Notice of Allowance dated Jan. 10, 2017, issued in U.S. Appl. No. 15/073,204.
Communication under Rule 71(3) EPC, dated Mar. 21, 2017, issued in corresponding European Application No. 13879835.0.
Korean Office Action dated Aug. 3, 2017, for corresponding Korean Application No. 10-2015-7031068, with an English translation.
Extended European Search Report for corresponding European Patent Application No. 17185527.3, dated Oct. 2, 2017.
Korean Office Action for corresponding Korean Application No. 10-2015-7031068, dated Feb. 21, 2018, with English translation.

\* cited by examiner

ALUMINUM ALLOY WIRE ROD, ALUMINUM ALLOY STRANDED WIRE, COATED WIRE, WIRE HARNESS AND MANUFACTURING METHOD OF ALUMINUM ALLOY WIRE ROD

CROSS REFERENCE TO RELATED APPLICATIONS

This application is a continuation-in-part of U.S. patent application Ser. No. 15/073,204 filed Mar. 17, 2016, which is a continuation-in-part of U.S. patent application Ser. No. 14/681,742 filed Apr. 8, 2015, which is a continuation application of International Patent Application No. PCT/JP2013/080955 filed Nov. 15, 2013, which claims the benefit of Japanese Patent Application No. 2013-075403, filed Mar. 29, 2013, the full contents of all of which are hereby incorporated by reference in their entirety.

BACKGROUND

Technical Field

The present disclosure relates to an aluminum alloy wire rod used as a conductor of an electric wiring structure, an aluminum alloy stranded wire, a coated wire, a wire harness, and a method of manufacturing an aluminum alloy wire rod, and particularly relates to an aluminum alloy wire rod that has an improved impact resistance and bending fatigue resistance while ensuring strength, elongation and conductivity equivalent to the related art products, even when used as an extra fine wire having a strand diameter of less than or equal to 0.5 mm.

Background

In the related art, a so-called wire harness has been used as an electric wiring structure for transportation vehicles such as automobiles, trains, and aircrafts, or an electric wiring structure for industrial robots. The wire harness is a member including electric wires each having a conductor made of copper or copper alloy and fitted with terminals (connectors) made of copper or copper alloy (e.g., brass). With recent rapid advancements in performances and functions of automobiles, various electrical devices and control devices installed in vehicles tend to increase in number and electric wiring structures used for devices also tends to increase in number. On the other hand, for environmental friendliness, lightweighting of transportation vehicles is strongly desired for improving fuel efficiency of transportation vehicles such as automobiles.

As one of the measures for achieving lightweighting of transportation vehicles, there have been, for example, continuous efforts in the studies of using aluminum or aluminum alloys as a conductor of an electric wiring structure, which is more lightweight, instead of conventionally used copper or copper alloys. Since aluminum has a specific gravity of about one-third of a specific gravity of copper and has a conductivity of about two-thirds of a conductivity of copper (in a case where pure copper is a standard for 100% IACS, pure aluminum has approximately 66% IACS), an aluminum conductor wire rod needs to have a cross sectional area of approximately 1.5 times greater than that of a copper conductor wire rod to allow the same electric current as the electric current flowing through the copper conductor wire rod to flow through the pure aluminum conductor wire rod. Even an aluminum conductor wire rod having an increased cross section as described above is used, using an aluminum conductor wire rod is advantageous from the viewpoint of lightweighting, since an aluminum conductor wire rod has a mass of about half the mass of a pure copper conductor wire rod. Note that, "% IACS" represents a conductivity when a resistivity $1.7241 \times 10^{-8}$ $\Omega$m of International Annealed Copper Standard is taken as 100% IACS.

However, it is known that pure aluminum wire rods, typically an aluminum alloy wire rod for transmission lines (JIS (Japanese Industrial Standard) A1060 and A1070), is generally poor in its durability to tension, resistance to impact, and bending characteristics. Therefore, for example, it cannot withstand a load abruptly applied by an operator or an industrial device while being installed to a car body, a tension at a crimp portion of a connecting portion between an electric wire and a terminal, and a cyclic stress loaded at a bending portion such as a door portion. On the other hand, an alloyed material containing various additive elements added thereto is capable of achieving an increased tensile strength, but a conductivity may decrease due to a solution phenomenon of the additive elements into aluminum, and because of excessive intermetallic compounds formed in aluminum, a wire break due to the intermetallic compounds may occur during wire drawing. Therefore, it is essential to limit or select additive elements to provide sufficient elongation characteristics to prevent a wire break, and it is further necessary to improve impact resistance and bending characteristics while ensuring a conductivity and a tensile strength equivalent to those in the related art.

For example, aluminum alloy wire rods containing Mg and Si are known as high strength aluminum alloy wire rods. A typical example of this aluminum alloy wire rod is a 6xxx series aluminum alloy (Al—Mg—Si based alloy) wire rod. Generally, the strength of the 6xxx series aluminum alloy wire rod can be increased by applying a solution treatment and an aging treatment. However, when manufacturing an extra fine wire such as a wire having a wire size of less than or equal to 0.5 mm using a 6xxx series aluminum alloy wire rod, although the strength can be increased by applying a solution heat treatment and an ageing treatment, the elongation tends to be insufficient.

For example, Japanese Laid-Open Patent Publication No. 2012-229485 discloses a conventional 6xxx series aluminum alloy wire used for an electric wiring structure of the transportation vehicle. An aluminum alloy wire disclosed in Japanese Laid-Open Patent Publication No. 2012-229485 is an extra fine wire that can provide an aluminum alloy wire having a high strength and a high conductivity, as well as an improved elongation. Also, Japanese Laid-Open Patent Publication No. 2012-229485 discloses that good elongation results in improved bending characteristics. However, for example, it is neither disclosed nor suggested to use an aluminum alloy wire as a wire harness attached to a door portion, and there is no disclosure or suggestion about impact resistance or bending fatigue resistance under an operating environment in which a fatigue fracture is likely to occur due to repeated bending stresses exerted by opening and closing of the door.

The present disclosure is related to providing an aluminum alloy wire rod used as a wire rod of an electric wiring structure, an aluminum alloy stranded wire, a coated wire, a wire harness, and a method of manufacturing an aluminum alloy wire rod that has an improved impact resistance and bending fatigue resistance at an ordinary temperature while ensuring strength, elongation and conductivity equivalent to those of a product of the related art (aluminum alloy wire disclosed in Japanese Laid-Open Patent Publication No. 2012-229485), when it is a prerequisite to use an aluminum alloy containing Mg and Si, by suppressing segregation where a difference in concentration of each added element occurs inside crystal grains or at grain boundaries in a parent phase (e.g., intra-granular segregation or grain boundary segregation) due to added elements including Mg and Si as major components, and particularly even when used as an extra fine wire having a strand diameter of less than or equal to 0.5 mm, and further, has an excellent bending fatigue resistance in a high temperature environment.

The present inventors have observed a microstructure of the aluminum alloy wire rod of the related art containing Mg and Si, and found that a portion in which Mg- and Si-concentrations are high is formed in a parent phase including grain boundaries. Therefore, the present inventors have carried out assiduous studies under the assumption that due to existence of a portion in which Mg- and Si-concentrations are high in a parent phase, an interface bonding between a portion in which Mg- and Si-concentrations are high and an aluminum parent phase is weak, which results in a decrease in a tensile strength, elongation, impact resistance and bending fatigue resistance. The present inventors have prepared various types of aluminum alloy wire rods with the concentrations of Mg and Si existing in the parent phase being varied by controlling a manufacturing process and having a composition in which a Mg/Si ratio is greater than 1 and Zr is an essential component, and carried out a comparison. As a result, it was found that, in a case where a portion where Mg- and Si-concentrations are high was formed neither inside crystal grains nor at grain boundaries in the parent phase, an improved impact resistance, bending fatigue resistance at an ordinary temperature and bending fatigue resistance in a high temperature environment can be achieved while ensuring strength, elongation and conductivity equivalent to a product of the related art (aluminum alloy wire disclosed in Japanese Laid-Open Patent Publication No. 2012-229485), and contrived the present disclosure.

SUMMARY

According to a first aspect of the present disclosure, an aluminum alloy wire rod has a composition comprising 0.1 mass % to 1.0 mass % Mg; 0.1 mass % to 1.0 mass % Si; 0.01 mass % to 1.40 mass % Fe; 0.01 mass % to 0.50 mass % Zr; 0.000 mass % to 0.100 mass % Ti; 0.000 mass % to 0.030 mass % B; 0.00 mass % to 1.00 mass % Cu; 0.00 mass % to 0.50 mass % Ag; 0.00 mass % to 0.50 mass % Au; 0.00 mass % to 1.00 mass % Mn; 0.00 mass % to 1.00 mass % Cr; 0.00 mass % to 0.50 mass % Hf; 0.00 mass % to 0.50 mass % V; 0.00 mass % to 0.50 mass % Sc; 0.00 mass % to 0.50 mass % Co; and 0.00 mass % to 0.50 mass % Ni, a Mg/Si ratio being greater than 1, wherein a dispersion density of an $Mg_2Si$ compound having a particle size of 0.5 µm to 5.0 µm is less than or equal to $3.0 \times 10^{-3}$ particles/µm$^2$, and in a sectional structure, a concentration of each of Mg and Si other than a compound is less than or equal to 2.00 mass %.

According to a second aspect of the present disclosure, a wire harness includes a coated wire including a coating layer at an outer periphery of one of an aluminum alloy wire rod and an aluminum alloy stranded wire, the aluminum alloy stranded wire comprising a plurality of the aluminum alloy wire rods which are stranded together; and a terminal fitted at an end portion of the coated wire, the coating layer being removed from the end portion, the aluminum alloy wire rod having a composition comprising 0.1 mass % to 1.0 mass % Mg, 0.1 mass % to 1.0 mass % Si; 0.01 mass % to 1.40 mass % Fe; 0.01 mass % to 0.50 mass % Zr; 0.000 mass % to 0.100 mass % Ti; 0.000 mass % to 0.030 mass % B; 0.00 mass % to 1.00 mass % Cu; 0.00 mass % to 0.50 mass % Ag; 0.00 mass % to 0.50 mass % Au; 0.00 mass % to 1.00 mass % Mn; 0.00 mass % to 1.00 mass % Cr; 0.00 mass % to 0.50 mass % Hf; 0.00 mass % to 0.50 mass % V; 0.00 mass % to 0.50 mass % Sc; 0.00 mass % to 0.50 mass % Co; and 0.00 mass % to 0.50 mass % Ni, a Mg/Si ratio being greater than 1, wherein a dispersion density of an $Mg_2Si$ compound having a particle size of 0.5 µm to 5.0 µm is less than or equal to $3.0 \times 10^{-3}$ particles/µm$^2$, and in a sectional structure, a concentration of each of Mg and Si other than a compound is less than or equal to 2.00 mass %.

According to a third aspect of the present disclosure, a method of manufacturing an aluminum alloy wire rod according to the first aspect of the disclosure, the aluminum alloy wire rod being obtained by forming a drawing stock through hot working subsequent to melting and casting, and thereafter carrying out processes including a first wire drawing process, a first heat treatment process, a second wire drawing process, a second heat treatment process and an aging heat treatment process in this order, wherein the first heat treatment process includes, after heating to a predetermined temperature within a range of 480° C. to 620° C., cooling at an average cooling rate of greater than or equal to 10° C./s at least to a temperature of 150° C., and the second heat treatment includes, after heating to a predetermined temperature within a range of not less than 300° C. but less than 480° C. for less than two minutes, cooling at an average cooling rate of greater than or equal to 9° C./s at least to a temperature of 150° C.

The aluminum alloy wire rod of the present disclosure is based on a prerequisite to use an aluminum alloy containing Mg and Si, and by suppressing segregation where a difference in concentration of each added element occurs inside crystal grains or at grain boundaries in a parent phase (e.g., intra-granular segregation or grain boundary segregation) due to added elements including Mg and Si as major components, particularly when used as an extra fine wire having a strand diameter of less than or equal to 0.5 mm, an aluminum alloy wire rod used as a conductor of an electric wiring structure, an aluminum alloy stranded wire, a coated wire, a wire harness, and a method of manufacturing an aluminum alloy wire rod can be provided with an improved impact resistance and bending fatigue resistance at an ordinary temperature, and further with an improved bending fatigue resistance in a high temperature environment, while ensuring strength, elongation and conductivity equivalent to those of a product of the related art (aluminum alloy wire disclosed in Japanese Laid-Open Patent Publication No. 2012-229485), and thus it is useful as a conducting wire for a motor, a battery cable, or a harness equipped on a transportation vehicle, and as a wiring structure of an industrial robot. Particularly, since an aluminum alloy wire rod of the present disclosure has a high tensile strength, a wire size thereof can be made smaller than that of the wire of the related art, and it can be appropriately used for a door, a trunk or a hood requiring a high impact resistance, bending fatigue resistance at an ordinary temperature and bending fatigue resistance in a high temperature environment.

DETAILED DESCRIPTION

An aluminum alloy wire rod of the present disclosure has a composition comprising 0.1 mass % to 1.0 mass % Mg; 0.1 mass % to 1.0 mass % Si; 0.01 mass % to 1.40 mass % Fe; 0.01 mass % to 0.50 mass % Zr; 0.000 mass % to 0.100 mass % Ti; 0.000 mass % to 0.030 mass % B; 0.00 mass % to 1.00 mass % Cu; 0.00 mass % to 0.50 mass % Ag; 0.00 mass % to 0.50 mass % Au; 0.00 mass % to 1.00 mass % Mn; 0.00 mass % to 1.00 mass % Cr; 0.00 mass % to 0.50 mass % Hf; 0.00 mass % to 0.50 mass % V; 0.00 mass % to 0.50 mass % Sc; 0.00 mass % to 0.50 mass % Co; and 0.00 mass % to 0.50 mass % Ni; Mg/Si ratio being greater than 1, wherein a dispersion density of an Mg$_2$Si compound having a particle size of 0.5 μm to 5.0 μm is less than or equal to $3.0\times10^{-3}$ particles/μm$^2$, and, in a sectional structure, a concentration of each of Mg and Si other than a compound is less than or equal to 2.00 mass %.

Herein, a compound is a substance in which two or more elements are chemically bonded, and in general, has a higher hardness and lower electric conductivity than an aluminum parent phase that is bonded through metallic bonding. Since a compound has a crystal structure different from that of the aluminum parent phase, it can be distinguished from an aluminum parent phase by studying an X-ray diffraction pattern.

Hereinafter, reasons for limiting chemical compositions or the like of the aluminum alloy wire rod of the present disclosure will be described.

(1) Chemical Composition

<Mg: 0.10 Mass % to 1.00 Mass %>

Mg (magnesium) is an element having a strengthening effect by forming a solid solution with an aluminum base material and a part thereof having an effect of improving a tensile strength, a bending fatigue resistance and a heat resistance by being combined with Si to form precipitates. However, in a case where Mg content is less than 0.10 mass %, the above effects are insufficient. In a case where Mg content exceeds 1.00 mass %, there is an increased possibility that, in sectional structure, a concentration of Mg other than a compound exceeds 2.00 mass %, thus resulting in decreased tensile strength, elongation, and bending fatigue resistance, as well as a reduced conductivity due to an increased amount of Mg element forming the solid solution. Accordingly, the Mg content is 0.10 mass % to 1.00 mass %. The Mg content is, when a high strength is of importance, preferably 0.50 mass % to 1.00 mass %, and in case where a conductivity is of importance, preferably 0.10 mass % to 0.50 mass %. Based on the points described above, 0.30 mass % to 0.70 mass % is generally preferable.

<Si: 0.10 Mass % to 1.00 Mass %>

Si (silicon) is an element that has an effect of improving a tensile strength, a bending fatigue resistance and a heat resistance by being combined with Mg to form precipitates. However, in a case where Si content is less than 0.10 mass %, the above effects are insufficient. In a case where Si content exceeds 1.00 mass %, there is an increased possibility that, in a sectional structure, a concentration of Si other than a compound exceeds 2.00 mass %, thus resulting in decreased tensile strength, elongation, and fatigue resistance, as well as a reduced conductivity due to an increased amount of Si element forming the solid solution. Accordingly, the Si content is 0.10 mass % to 1.00 mass %. The Si content is, when a high strength is of importance, preferably 0.50 mass % to 1.00 mass %, and in case where a conductivity is of importance, preferably 0.10 mass % to 0.50 mass %. Based on the points described above, 0.30 mass % to 0.70 mass % is generally preferable.

<Fe: 0.01 Mass % to 1.40 Mass %>

Fe (iron) is an element that contributes to refinement of crystal grains mainly by forming an Al—Fe based intermetallic compound and provides improved tensile strength and bending fatigue resistance. Fe dissolves in Al only by 0.05 mass % at 655° C. and even less at room temperature. Accordingly, the remaining Fe that could not dissolve in Al will be crystallized or precipitated as an intermetallic compound such as Al—Fe, Al—Fe—Si, and Al—Fe—Si—Mg. This intermetallic compound contributes to refinement of crystal grains and provides improved tensile strength and bending fatigue resistance. Further, Fe has, also by Fe that has dissolved in Al, an effect of providing an improved tensile strength. In a case where Fe content is less than 0.01 mass %, those effects are insufficient. In a case where Fe content exceeds 1.40 mass %, a wire drawing workability worsens due to coarsening of crystallized materials or precipitates. As a result, a target bending fatigue resistance cannot be achieved and also a conductivity decreases. Therefore, Fe content is 0.01 mass % to 1.40 mass %, and preferably 0.15 mass % to 0.90 mass %, and more preferably 0.15 mass % to 0.45 mass %.

The aluminum alloy wire rod of the present disclosure includes Mg, Si, Fe and Zr as essential components, and may further contain at least one selected from a group consisting of Ti and B, and/or at least one selected from a group consisting of Cu, Ag, Au, Mn, Cr, Hf, V, Sc, Co and Ni, as necessary.

<Ti: 0.001 Mass % to 0.100 Mass %>

Ti is an element having an effect of refining the structure of an ingot during dissolution casting. In a case where an ingot has a coarse structure, the ingot may crack during casting or a wire break may occur during a wire rod processing step, which is industrially undesirable. In a case where Ti content is less than 0.001 mass %, the aforementioned effect cannot be achieved sufficiently, and in a case where Ti content exceeds 0.100 mass %, the conductivity tends to decrease. Accordingly, the Ti content is 0.001 mass % to 0.100 mass %, preferably 0.005 mass % to 0.050 mass %, and more preferably 0.005 mass % to 0.030 mass %.

<B: 0.001 Mass % to 0.030 Mass %>

Similarly to Ti, B is an element having an effect of refining the structure of an ingot during dissolution casting. In a case where an ingot has a coarse structure, the ingot may crack during casting or a wire break is likely to occur during a wire rod processing step, which is industrially undesirable. In a case where B content is less than 0.001 mass %, the aforementioned effect cannot be achieved sufficiently, and in a case where B content exceeds 0.030 mass %, the conductivity tends to decrease. Accordingly, the B content is 0.001 mass % to 0.030 mass %, preferably 0.001 mass % to 0.020 mass %, and more preferably 0.001 mass % to 0.010 mass %.

To contain at least one of <Cu: 0.01 mass % to 1.00 mass %>, <Ag: 0.01 mass % to 0.50 mass %>, <Au: 0.01 mass % to 0.50 mass %>, <Mn: 0.01 mass % to 1.00 mass %>, <Cr: 0.01 mass % to 1.00 mass %>, and <Zr: 0.01 mass % to 0.50 mass %>, <Hf: 0.01 mass % to 0.50 mass %>, <V: 0.01 mass % to 0.50 mass %>, <Sc: 0.01 mass % to 0.50 mass %>, <Co: 0.01 mass % to 0.50 mass %>, and <Ni: 0.01 mass % to 0.50 mass %>.

Each of Cu, Ag, Au, Mn, Cr, Zr, Hf, V, Sc, Co and Ni is an element having an effect of refining crystal grains, and Cu, Ag and Au are elements further having an effect of increasing a grain boundary strength by being precipitated at a grain boundary. In a case where at least one of the elements described above is contained by 0.01 mass % or more, the aforementioned effects can be achieved and a tensile strength, an elongation, and a bending fatigue resistance can be further improved. On the other hand, in a case where any one of Cu, Ag, Au, Mn, Cr, Zr, Hf, V, Sc, Co and Ni has a content exceeding the upper limit thereof mentioned above, a wire break is likely to occur since a compound containing the said elements coarsens and deteriorates wire drawing workability, and also a conductivity tends to decrease.

Therefore, ranges of contents of Cu, Ag, Au, Mn, Cr, Zr, Hf, V, Sc, Co and Ni are the ranges described above, respectively.

The more the contents of Fe, Ti, B, Cu, Ag, Au, Mn, Cr, Zr, Hf, V, Sc, Co and Ni, the lower the conductivity tends to be and the more the wire drawing workability tends to deteriorate. Therefore, it is preferable that a sum of the contents of the elements is less than or equal to 2.00 mass %. With the aluminum alloy wire rod of the present disclosure, since Fe is an essential element, the sum of contents of Fe, Ti, B, Cu, Ag, Au, Mn, Cr, Zr, Hf, V, Sc, Co and Ni is 0.01 mass % to 2.00 mass %. It is further preferable that the sum of contents of these elements is 0.10 mass % to 2.00 mass %. In a case where the above elements are added alone, the compound containing the element tends to coarsen more as the content increases. Since this may degrade wire drawing workability and a wire break is likely to occur, ranges of content of the respective elements are as specified above.

In order to improve the tensile strength, the elongation, the impact resistance and the bending fatigue resistance while maintaining a high conductivity, the sum of contents of Fe, Ti, B, Cu, Ag, Au, Mn, Cr, Zr, Hf, V, Sc, Co and Ni is particularly preferably 0.10 mass % to 0.80 mass %, and further preferably 0.20 mass % to 0.60 mass %. On the other hand, in order to further improve the tensile strength, the elongation, the impact resistance and the bending fatigue resistance, although the conductivity will slightly decrease, it is particularly preferably more than 0.80 mass % to 2.00 mass %, and further preferably 1.00 mass % to 2.00 mass %.

<Balance: Al and Incidental Impurities>

The balance, i.e., components other than those described above, includes Al (aluminum) and incidental impurities. Herein, incidental impurities means impurities contained by an amount which could be contained inevitably during the manufacturing process. Since incidental impurities could cause a decrease in conductivity depending on a content thereof, it is preferable to suppress the content of the incidental impurities to some extent considering the decrease in the conductivity. Components that may be incidental impurities include, for example, Ga, Zn, Bi, and Pb.

(2) Dispersion Density of a $Mg_2Si$ Compound Having a Particle Size of 0.5 μm to 5.0 μm is Less than or Equal to $3.0 \times 10^{-3}$ Particles/μm$^2$ The aluminum alloy wire rod of the present disclosure prescribes density of an $Mg_2Si$ compound having a particular dimension and existing in a crystal grain of an aluminum parent phase. The $Mg_2Si$ compound of 0.5 μm to 5.0 μm is mainly formed in a case where a first heat treatment described below is performed for two minutes or more and below 480° C., in a case where a cooling rate of a first heat treatment is less than 10° C./s, in a case where a second heat treatment is performed for two minutes or more and below 480° C., and in case where a cooling rate of a second heat treatment is less than 9° C./s. When $Mg_2Si$ compound of 0.5 μm to 5.0 μm is formed with a dispersion density of over $3.0 \times 10^{-3}/\mu m^2$, an acicular $Mg_2Si$ precipitate formed in the aging heat treatment decreases, and a range of improvement of tensile strength, impact resistance, flex fatigue resistance, and conductivity decreases. It is preferable that the dispersion density of the $Mg_2Si$ compound of 0.5 μm to 5 μm is lower. That is, it is preferable when it is closer to zero. Also, when a density of not only the $Mg_2Si$ compound, but also a compound composed primarily of a Mg—Si system is out of the aforementioned prescribed range, an acicular $Mg_2Si$ precipitate which is formed during the aging heat treatment will decrease and a range of improvement of tensile strength, impact resistance, flex fatigue resistance, and conductivity will decrease, a density of a compound composed primarily of a Mg—Si system is also set similarly in the aforementioned prescribed range.

(3) Concentration of Each of Si and Mg in a Parent Phase Measured in a Sectional Structure is Less than or Equal to 2.00 Mass %

The aluminum alloy wire rod of the present disclosure has, in a sectional structure, respective concentrations of Mg and Si other than a compound as described below, and thus ensures strength, elongation and conductivity at levels equivalent to those of a product of the related art (aluminum alloy wire disclosed in Japanese Laid-Open Patent Publication No. 2012-229485), and can improve impact resistance and flex fatigue resistance.

It is an essential matter to specify the invention that, in sectional structure, each of Mg and Si other than a compound has a concentration of less than or equal to 2.00 mass %. In a case where at least one of the concentrations of Mg and Si is higher than 2.00 mass %, an interface with an aluminum parent phase become weak, there is a tendency that tensile strength, elongation, impact resistance and flex fatigue resistance decrease, and also a wire drawing workability may decrease. Further, the concentrations of Mg and Si are preferably less than or equal to 1.50 mass %, respectively, and more preferably, less than or equal to 1.00 mass %, respectively.

Further, according to the present disclosure, it is preferable that, in a sectional structure, a concentration of each of Fe, Ti, B, Cu, Ag, Au, Mn, Cr, Zr, Hf, V, Sc, Co and Ni other than a compound is less than or equal to 1.00 mass %. This is because, in a case where a concentration of each of the aforementioned added elements exceeds 1.00 mass %, an interface with an aluminum parent phase weakens, and results in a decrease in a tensile strength, elongation, impact resistance and bending fatigue resistance, and further a decrease in wire drawing property.

Further, in a case where, in a sectional structure, a concentration of each of Mg, Si, Fe, Ti, B, Cu, Ag, Au, Mn, Cr, Zr, Hf, V, Sc, Co and Ni other than a compound is less than or equal to 1.00 mass %, an interface with an aluminum parent phase, which is a weak point, decreases, and further results in an increase in a tensile strength, elongation, impact resistance, bending fatigue resistance and wire drawing property, and thus it is particularly preferable.

The measurement of concentrations of Mg and Si was performed by using EDX (Energy Dispersive X-ray Spectroscopy) on a photographic image obtained by a transmission electron microscope (TEM). A sample having a thickness of 0.15 μm was prepared using a Focused Ion Beam (FIB) method such that an area of greater than or equal to 300 μm$^2$ is obtained in total, and a area analysis was carried out to investigate the concentrations of Mg and Si. In a high concentration part, an area analysis or a point analysis with an analysis region of 10 μm$^2$ or less was carried out to measure the maximum concentrations of added elements. A quantitative analysis was carried out, and in a case where a part exceeding 2.0 mass % was found, a diffraction pattern was observed, and in a case where a diffraction pattern different from that of the aluminum parent phase was obtained, it was determined as a compound and excluded from a count.

An aluminum alloy wire rod for which an increase in the concentration of each of the aforementioned added elements in the parent phase is suppressed can be obtained by controlling performed with a combination of alloy composition and a manufacturing process. A description is now made of a preferred manufacturing method of the aluminum alloy wire rod of the present disclosure.

(Manufacturing Method of the Aluminum Alloy Wire Rod of the Present Disclosure)

The aluminum alloy wire rod of the present disclosure can be manufactured with a manufacturing method including sequentially performing each of the processes including [1] melting, [2] casting, [3] hot working (e.g., grooved roller processing), [4] first wire drawing, [5] first heat treatment (solution heat treatment), [6] second wire drawing, [7] second heat treatment, and [8] aging heat treatment. Note that a stranding step or a wire resin-coating step may be provided before or after the second heat treatment or after the aging heat treatment. Hereinafter, steps of [1] to [8] will be described.

[1] Melting

Melting is performed while adjusting the quantities of each component to obtain an aluminum alloy composition described above.

[2] Casting and [3] Hot Working (e.g., Groove Roller Process)

Subsequently, using a Properzi-type continuous casting rolling mill which is an assembly of a casting wheel and a belt, molten metal is cast with a water-cooled mold and continuously rolled to obtain a bar having an appropriate size of, for example, a diameter of 5.0 mmϕ to 13.0 mmϕ. A cooling rate during casting at this time is, in regard to preventing coarsening of Fe-based crystallized products and preventing a decrease in conductivity due to forced solid solution of Fe, preferably 1° C./s to 20° C./s, but it is not limited thereto. Casting and hot rolling may be performed by billet casting and an extrusion technique.

[4] First Wire Drawing

Subsequently, the surface is stripped and the bar is made into an appropriate size of, for example, 5.0 mm ϕ to 12.5 mm ϕ, and wire drawing is performed by cold rolling. It is preferable that a reduction ratio η is within a range of 1 to 6. The reduction ratio η is represented by:

$$\eta = \ln(A0/A1),$$

where A0 is a wire rod cross sectional area before wire drawing and A1 is a wire rod cross sectional area after wire drawing.

In a case where the reduction ratio η is less than 1, in a heat processing of a subsequent step, a recrystallized particle coarsens and a tensile strength and an elongation significantly decreases, which may cause a wire break. In a case where the reduction ratio η is greater than 6, the wire drawing becomes difficult and may be problematic from a quality point of view since a wire break might occur during a wire drawing process. The stripping of the surface has an effect of cleaning the surface, but does not need to be performed.

[5] First Heat Treatment (Solution Heat Treatment)

A first heat treatment is applied on the cold-drawn work piece. The first heat treatment of the present disclosure is a solution heat treatment that is performed for a purpose such as dissolving compound of Mg and Si randomly contained in the work piece into a parent phase of an aluminum alloy. The solution heat treatment is performed immediately before the aging heat treatment in the related art. Whereas, in the present disclosure, it is performed before the second wire-drawing. Accordingly, it is possible to homogenize Mg and Si during a working and leads to a suppression in the segregation of a Mg component and a Si component at grain boundaries after the final aging heat treatment. That is, the first heat treatment of the present disclosure is a heat treatment which is different from an intermediate heat treatment which is usually performed during the wire drawing in a manufacturing method of the related art. The first heat treatment is specifically a heat treatment including heating to a predetermined temperature in a range of 480° C. to 620° C. and thereafter cooling at an average cooling rate of greater than or equal to 10° C./s to a temperature of at least to 150° C. When a predetermined temperature during the first heat treatment temperature is higher than 620° C., an aluminum alloy wire containing the added elements will partly melt, and there is a possibility of a decrease in elongation, impact resistance and bending fatigue resistance, and when the predetermined temperature is lower than 480° C., the solution treatment cannot be achieve sufficiently and an increasing effect of the tensile strength in the subsequent aging heat treatment step cannot be obtained sufficiently, and the tensile strength will decrease. Therefore, the predetermined temperature during the heating in the first heat treatment is in a range of 480° C. to 620° C. and preferably in a range of 500° C. to 600° C., and more preferably in a range of 520° C. to 580° C.

A method of performing the first heat treatment may be, for example, batch heat treatment or may be continuous heat treatment such as high-frequency heating, conduction heating, and running heating.

In a case where high-frequency heating and conduction heating are used, a wire rod temperature increases with a passage of time, since it normally has a structure in which electric current continues flowing through the wire rod. Accordingly, since the wire rod may melt when an electric current continues flowing through, it is necessary to perform heat treatment in an appropriate time range. In a case where running heating is used, since it is an annealing in a short time, the temperature of a running annealing furnace is usually set higher than the wire rod temperature. Since the wire rod may melt with a heat treatment over a long time, it is necessary to perform heat treatment in an appropriate time range. Also, all heat treatments require at least a predetermined time period in which Mg and Si compounds contained randomly in the work piece will be dissolved into an aluminum parent phase. Hereinafter, the heat treatment by each method will be described.

The continuous heat treatment by high-frequency heating is a heat treatment by joule heat generated from the wire rod itself by an induced current by the wire rod continuously passing through a magnetic field caused by a high frequency. Steps of rapid heating and rapid cooling are included, and the wire rod can be heat-treated by controlling the wire rod temperature and the heat treatment time. The cooling is performed after rapid heating by continuously allowing the wire rod to pass through water or in a nitrogen gas atmosphere. This heat treatment time is 0.01 s to 2 s, preferably 0.05 s to 1 s, and more preferably 0.05 s to 0.5 s.

The continuous conducting heat treatment is a heat treatment by joule heat generated from the wire rod itself by allowing an electric current to flow in the wire rod that continuously passes two electrode wheels. Steps of rapid heating and rapid cooling are included, and the wire rod can be heat-treated by controlling the wire rod temperature and the heat treatment time. The cooling is performed after rapid heating by continuously allowing the wire rod to pass through water, atmosphere or a nitrogen gas atmosphere. This heat treatment time period is 0.01 s to 2 s, preferably 0.05 s to 1 s, and more preferably 0.05 s to 0.5 s.

A continuous running heat treatment is a heat treatment in which the wire rod continuously passes through a heat treatment furnace maintained at a high-temperature. Steps of rapid heating and rapid cooling are included, and the wire rod can be heat-treated by controlling the temperature in the heat treatment furnace and the heat treatment time. The cooling is performed after rapid heating by continuously allowing the wire rod to pass through water, atmosphere or a nitrogen gas atmosphere. This heat treatment time period is 0.5 s to 120 s, preferably 0.5 s to 60 s, and more preferably 0.5 s to 20 s.

The batch heat treatment is a method in which a wire rod is placed in an annealing furnace and heat-treated at a predetermined temperature setting and a setup time. The wire rod itself should be heated at a predetermined temperature for about several tens of seconds, but in industrial application, it is preferable to perform for more than 30 minutes to suppress uneven heat treatment on the wire rod. An upper limit of the heat treatment time is not particularly limited as long as there are five crystal grains when counted in a radial direction of a wire rod, but in industrial application, since productivity increases when performed in a short time, heat treatment is performed within ten hours, and preferably within six hours.

In a case where one or both of the wire rod temperature or the heat treatment time are lower than conditions defined above, a solution process will be incomplete and an amount of an $Mg_2Si$ precipitate produced in the aging heat treatment, which is a post-process, decreases. Thus, a range of improvement of tensile strength, impact resistance, flex fatigue resistance and conductivity decreases. In a case where one or both of the wire rod temperature and the annealing time are higher than conditions defined above, coarsening of crystal grains and also a partial fusion (eutectic fusion) of a compound phase in the aluminum alloy wire rod occur. Thus, the tensile strength and the elongation decrease, and a wire break is likely to occur when handling the wire rod.

It is an essential matter to specify the invention to perform the cooling in the first heat treatment at an average cooling rate of greater than or equal to 10° C./s to a temperature of at least 150° C. This is because, at an average cooling rate of less than 10° C./s, precipitates of Mg and Si or the like will be produced during the cooling and a solution process will not be performed sufficiently, and thus an improvement effect of the tensile strength in the subsequent aging heat treatment step will be restricted and a sufficient tensile strength will not be obtained. Note that the average cooling rate is preferably greater than or equal to 50° C./s, and more preferably greater than or equal to 100° C./s.

For any of the heat treatment methods described above, the cooling in the first heat treatment of the present disclosure is preferably performed by heating the aluminum alloy wire rod after the first wire drawing to a predetermined temperature and thereafter allowing the wire rod to pass through water, but in such a case, the cooling rate is possible cannot be measured accurately. Thus, in such a case, in each of the heat treatment methods, assuming that an aluminum alloy wire rod is cooled to water temperature (approximately 20° C.) immediately after water cooling, a cooling rate calculated as described below was taken as an average cooling rate by water cooling after heating for each of the heat treatment methods. That is, in a batch heat treatment, from the perspective that it is important that a period of time in which 150° C. or above is maintained is within 40 seconds from the beginning of the cooling, the cooling rate is greater than or equal to $(500-150)/40=8.75°$ C./s when it is heat-treated to 500° C., and greater than or equal to $(600-150)/40=11.25°$ C./s when it is heat-treated to 600° C. In a continuous heat treatment by high-frequency heating, the cooling rate is 100° C./s or above, since it is a mechanism that, after heating, passes an aluminum alloy wire rod for a few to several meters at a wire speed of 100 m/min to 1500 m/min and thereafter water cools the aluminum alloy wire rod. In a continuous heat treatment by conduction heating, the cooling rate is 100° C./s or above, since it is a mechanism that, immediately after heating, water cools an aluminum alloy wire rod. In a continuous heat treatment by running heating, the cooling rate is 100° C./s or above, in a case of a mechanism that, immediately after heating, water cools an aluminum alloy wire rod at a wire speed of 10 m/min to 500 m/min, and in a case of a mechanism that, after heating, air cools while being passed for a few to several meters to a few to several tens of meters, assuming that the aluminum alloy wire rod is cooled to room temperature (approximately 20° C.) immediately after being wound up on a drum with a length of section during air-cooling being 10 m and a cooling start temperature being 500° C., it can be calculated that a cooling of approximately 6° C./s to 292° C./s is carried out. Thus, the cooling rate of 10° C./s or above is well possible. However, in any of the heat treatment methods, it is only necessary to rapidly cool to at least 150° C. from the perspective of achieving a purpose of solution heat treatment.

Further, it is preferable that the cooling in the first heat treatment is performed at an average cooling rate of 20° C./s or above to a temperature of at least 250° C. to give an effect of improving the tensile strength in the subsequent aging heat treatment step by suppressing the precipitation of Mg and Si. Since peaks of precipitation temperature zones of Mg and Si are located at 300° C. to 400° C., it is preferable to speed up the cooling rate at least at the said temperature to suppress the precipitation of Mg and Si during the cooling.

[6] Second Wire Drawing

After the first heat treatment, wire drawing is further carried out in a cold processing. During this, a reduction ratio $\eta$ is preferably within a range of 1 to 6. The reduction ratio $\eta$ has an influence on formation and growth of recrystallized grains. This is because, if the reduction ratio $\eta$ is less than 1, during the heat treatment in a subsequent step, there is a tendency that coarsening of recrystallized grains occur and the tensile strength and the elongation drastically decrease, and if the reduction ratio $\eta$ is greater than 6, wire drawing becomes difficult and there is a tendency that problems arise in quality, such as a wire break during wire drawing.

[7] Second Heat Treatment

A second heat treatment is performed on a cold wire-drawn work piece. The second heat treatment is a heat treatment which is different from the first heat treatment described above and the aging heat treatment described below. The second heat treatment may be performed by batch annealing similarly to the first heat treatment, or may be performed by continuous annealing such as high-frequency heating, conduction heating, and running heating. However, it is necessary to perform in a short time. This is because when heat treatment is applied for a long time, precipitation of Mg and Si occurs, and an effect of improving of the tensile strength in the subsequent aging heat treatment step cannot be obtained and the tensile strength decreases. That is, the second heat treatment needs to be applied by a manufacturing method that can perform processes of increasing the temperature from 150° C., holding, decreasing the temperature to 150° C. in less than two minutes. Therefore, in the case of the batch annealing that is usually carried out by a holding for a long period of time, it is difficult to practically perform, and thus continuous annealing such as high-frequency heating, conduction heating, and running heating is preferable.

The second heat treatment is not a solution heat treatment such as the first heat treatment, but rather a heat treatment that performed for recovering a flexibility of the wire rod, and to improve elongation. The heating temperature of the second heat treatment is higher than or equal to 300° C. and lower than 480° C. This is because when heating temperature of the second heat treatment is lower than 300° C., recrystallization will not take place, and there is a tendency that an effect of improving the elongation cannot be obtained, and when the heating temperature is 480° C. or higher, a part in which a concentration of Mg or Si is high is likely to occur inside grains or at grain boundaries in the parent phase, and a tensile strength, an elongation, an impact resistance, and a flex fatigue resistance tend to decrease. Further, the heating temperature of the second heat treatment is preferably 300° C. to 450° C., and more preferably 325° C. to 450° C. The heating time of the second heat treatment is shorter than two minutes, since if it is two minutes or longer, an $Mg_2Si$ compound of 0.5 μm to 5.0 μm is likely to be produced and a dispersion density of the $Mg_2Si$ compound of 0.5 μm to 5.0 μm tends to exceed $3.0\times10^{-3}/\mu m^2$.

It is an essential matter to specify the invention to perform the cooling in the second heat treatment at an average cooling rate of greater than or equal to 8° C./s to a temperature of at least 150° C. This is because, at an average cooling rate of less than 9° C./s, precipitates such as Mg and Si will be produced during the cooling, and this restricts an effect of improving the tensile strength by the subsequent aging heat treatment step and a sufficient tensile strength will not be obtained. Note that the average cooling rate is preferably greater than or equal to 50° C./s, and more preferably greater than or equal to 100° C./s.

Further, in the cooling in the second heat treatment, it is preferable to perform at an average cooling rate of greater than or equal to 20° C./s to a temperature of at least 250° C., to give an effect of improving the tensile strength by a subsequent aging heat treatment step by suppressing the precipitation of Mg and Si. Since the peaks of precipitation temperature zones of Mg and Si are located at 300° C. to 400° C., it is preferable to speed up the cooling rate at least at the said temperature to suppress the precipitation of Mg and Si.

[8] Aging Heat Treatment

Subsequently, an aging heat treatment is applied. The aging heat treatment is conducted to cause precipitation of acicular $Mg_2Si$ precipitates. The heating temperature in the aging heat treatment is preferably 140° C. to 250° C. When the heating temperature is lower than 140° C., it is not possible to cause precipitation of the acicular $Mg_2Si$ precipitates sufficiently, and strength, impact resistance, bending fatigue resistance and conductivity tend to lack. When the heating temperature is higher than 250° C., due to an increase in the size of the $Mg_2Si$ precipitate, the conductivity increases, but strength, impact resistance, and bending fatigue resistance tend to lack. The heating temperature in the aging heat treatment is, preferably 160° C. to 200° C. when an impact resistance and a high flex fatigue resistance are of importance, and preferably 180° C. to 220° C. when conductivity is of importance. As for the heating time, the most suitable length of time varies with temperature. In order to improve a strength, an impact resistance, and a bending fatigue resistance, the heating time is preferably a long when the temperature is low and the heating time is short when the temperature is high. Considering the productivity, a short period of time is preferable, which is preferably 15 hours or less and further preferably 10 hours or less. It is preferable that, the cooling in the aging heat treatment is performed at the fastest possible cooling rate to prevent variation in characteristics. However, in a case where it cannot be cooled fast in a manufacturing process, an aging condition can be set appropriately by taking into account that an increase and a decrease in the acicular $Mg_2Si$ precipitate may occur during the cooling.

A strand diameter of the aluminum alloy wire rod of the present disclosure is not particularly limited and can be determined as appropriate depending on an application, and it is preferably 0.1 mmϕ to 0.5 mmϕ for a fine wire, and 0.8 mmϕ to 1.5 mmϕ for a case of a middle sized wire. The present aluminum alloy wire rod has an advantage in that it can be used as a thin single wire as an aluminum alloy wire, but may also be used as an aluminum alloy stranded wire obtained by stranding a plurality of them together, and among the aforementioned steps [1] to [8] of the manufacturing method of the present disclosure, after bundling and stranding a plurality of aluminum alloy wires obtained by sequentially performing each of steps [1] to [6], the steps of [7] second heat treatment and [8] aging heat treatment may be performed.

Also, in the present disclosure, homogenizing heat treatment performed in the prior art may be performed as a further additional step after the continuous casting rolling. Since a homogenizing heat treatment can uniformly disperse precipitates (mainly Mg—Si based compound) of the added element, it becomes easy to obtain a uniform crystal structure in the subsequent first heat treatment, and as a result, improvement in a tensile strength, an elongation, an impact resistance, and a flex fatigue resistance can be obtained more stably. The homogenizing heat treatment is preferably performed at a heating temperature of 450° C. to 600° C. and a heating time of 1 to 10 hours, and more preferably 500° C. to 600° C. Also, as for the cooling in the homogenizing heat treatment, a slow cooling at an average cooling rate of 0.1° C./min to 10° C./min is preferable since it becomes easier to obtain a uniform compound.

Note that the above description merely indicates an example of an embodiment of the present disclosure and can add various modification may be added to the claims. For example, the aluminum alloy wire rod of the present disclosure has an impact absorption energy of greater than or equal to 5 $J/mm^2$, and can achieve an improved impact resistance. Further, a number of cycles to fracture measured by a flex fatigue test is 200,000 times or more, and can achieve an improved flex fatigue resistance. Also, the aluminum alloy wire rod of the present disclosure can be used as an aluminum alloy wire, or as an aluminum alloy stranded wire obtained by stranding a plurality of aluminum alloy wires, and may also be used as a coated wire having a coating layer at an outer periphery of the aluminum alloy wire or the aluminum alloy stranded wire, and, in addition, it can also be used as a wire harness having a coated wire and a terminal fitted at an end portion of the coated wire, the coating layer being removed from the end portion.

EXAMPLE

The present disclosure will be described in detail based on the following examples. Note that the present disclosure is not limited to examples described below.

Examples and Comparative Examples

Using a Properzi-type continuous casting rolling mill, molten metal containing Mg, Si, Fe and Al, and selectively added Ti, B, Cu, Ag, Au, Mn, Cr, Zr, Hf, V, Sc, Co and Ni, with contents (mass %) shown in Tables 1-1, 1-2, 1-3 and 2 is cast with a water-cooled mold and rolled into a bar of approximately 9.5 mmϕ. A casting cooling rate at this time was approximately 15° C./s. Then, a first wire drawing was carried out to obtain a predetermined reduction ratio. Then, an first heat treatment was performed with conditions indicated in Tables 3-1, 3-2, 3-3, 4-1 and 4-2 on a work piece subjected to the first wire drawing, and further, a second wire drawing was performed until a wire size of 0.31 mmϕ was obtained. Then, a second heat treatment was applied under conditions shown in Tables 3-1, 3-2, 3-3, 4-1 and 4-2. In both of the first and second heat treatments, in a case of a batch heat treatment, a wire rod temperature was measured with a thermocouple wound around the wire rod. In a case of continuous conducting heat treatment, since measurement at a part where the temperature of the wire rod is the highest is difficult due to the facility, the temperature was measured with a fiber optic radiation thermometer (manufactured by Japan Sensor Corporation) at a position upstream of a portion where the temperature of the wire rod becomes highest, and a maximum temperature was calculated in consideration of joule heat and heat dissipation. In a case of high-frequency heating and consecutive running heat treatment, a wire rod temperature in the vicinity of a heat treatment section outlet was measured. After the second heat treatment, an aging heat treatment was applied under conditions shown in Tables 3-1, 3-2, 3-3, 4-1 and 4-2 to produce an aluminum alloy wire. Note that Comparative Example 12 was also evaluated since it has a composition of sample No. 2 in Table 1 in Patent Japanese Laid-Open Patent Publication No. 2012-229485 and an aluminum alloy wire was produced with a manufacturing method equivalent to the manufacturing method disclosed in Japanese Laid-Open Patent Publication No. 2012-229485.

For each of aluminum alloy wires of the Example and the Comparative Example, each characteristic was measured by methods shown below. The results are shown in Tables 3-1, 3-2, 3-3, 4-1, 4-2 and 5.

(A) Observation and Evaluation Method of Dispersion Density of $Mg_2Si$ Compound Particles Wire rods of Examples and Comparative Examples were formed as thin films by a Focused Ion Beam (FIB) method and an arbitrary range was observed using a transmission electron microscope (TEM). The $Mg_2Si$ compound was subjected to a composition analysis by EDX and the kinds of compounds were identified. Further, since the $Mg_2Si$ compound was observed as a plate-like compound, a compound with a part corresponding to an edge of the plate-like compound is 0.5 µm to 5.0 µm was counted in the captured image. In a case where a compound extends outside the measuring range, it is counted into the number of compound if 0.5 µm or more of the compound was observed. The dispersion density of the $Mg_2Si$ compound was obtained by setting a range in which 20 or more can be counted and calculating using an equation: $Mg_2Si$ Dispersion Density of Compound (number/µm$^2$)=Number of $Mg_2Si$ Compounds (number)/Count Target Range (µm$^2$). Depending on the situation, a plurality of photographic images were used as the count target range. In a case where there were not much compound and it was not possible to count 20 or more, 1000 µm$^2$ was specified and a dispersion density in that range was calculated.

Note that the dispersion density of an $Mg_2Si$ compound was calculated with a sample thickness of the thin film of 0.15 am being taken as a reference thickness. In a case where the sample thickness is different from the reference thickness, the dispersion density of the $Mg_2Si$ compound of a reference thickness can be calculated by converting the sample thickness with the reference thickness, in other words, multiplying (reference thickness/sample thickness) by a dispersion density of the $Mg_2Si$ compound of the sample thickness calculated based on the captured image. In the present examples and the comparative examples, all the samples were produced using a FIB method by setting the sample thickness to approximately 0.15 µm. If the dispersion density of the $Mg_2Si$ compound was within a range of 0 to $3.0 \times 10^{-3}$ µm$^2$, it was determined that the dispersion density of the $Mg_2Si$ compound is within an appropriate range and indicated as "A", and if it was not within a range of 0 to $3.0 \times 10^{-3}$ µm$^2$, it was determined that the dispersion density of the $Mg_2Si$ compound is within an inappropriate range and indicated as "B".

(B) Measurement of Concentrations of Mg and Si in Parent Phase

The measurement of concentrations of Mg and Si in a parent phase was performed by using EDX (Energy Dispersive X-ray Spectroscopy) on a photographic image obtained by a transmission electron microscope (TEM). A sample having a thickness of 0.15 µm was prepared using a Focused Ion Beam (FIB) method such that an area of greater than or equal to 300 µm$^2$ is obtained in total, and an area analysis was carried out to investigate the concentrations of Mg and Si. In a high concentration part, an area analysis or a point analysis with an analysis region of 10 µm$^2$ or less was carried out to measure the maximum concentrations of added elements. A quantitative analysis was carried out, and in a case where a portion exceeding 2.0 mass % was found, a diffraction pattern was observed, and in a case where a diffraction pattern different from that of the aluminum parent phase was obtained, it was determined as a compound and excluded from a count. In Tables 3-1 to 4-2, in a case where the concentration of each of Mg, Si, Fe, Ti, B, Cu, Ag, Au, Mn, Cr, Zr, Hf, V, Sc, Co and Ni in a parent phase is less than or equal to 1.00 mass % at each analysis region, it was indicated as "A"; in a case where the concentration of at least one of Mg and Si in a parent phase is greater than 1.00 mass % and less than or equal to 2.00 mass % and also the concentration of each of Fe, Ti, B, Cu, Ag, Au, Mn, Cr, Zr, Hf, V, Sc, Co and Ni in a parent phase is less than or equal to 1.00 mass % at each analysis region, it was indicated as "B"; in a case where the concentration of each of Mg and Si in a parent phase was less than or equal to 2.00 mass % and also the concentration of Fe, Ti, B, Cu, Ag, Au, Mn, Cr, Zr, Hf, V, Sc, Co and Ni is greater than 1.00 mass % at each analysis region, it was indicated as "C"; and in a case where the concentration of at least one of Mg and Si in a parent phase was greater than 2.00 mass % at any one of the analysis regions, it was evaluated as a being failed and indicated as "D".

(C) Measurement of Tensile Strength (TS) and Flexibility (Elongation after Fracture)

In conformity with JIS Z2241, a tensile test was carried out for three materials under test (aluminum alloy wires) each time, and an average value thereof was obtained. The tensile strength of greater than or equal to 150 MPa was regarded as a pass level so as to keep the tensile strength of a crimp portion at a connection portion between an electric wire and a terminal and to withstand a load abruptly applied during an installation work to a car body. As for the elongation, greater than or equal to 5% was regarded as a pass.

(D) Conductivity (EC)

In a constant temperature bath in which a test piece of 300 mm in length is held at 20° C. (±0.5° C.), a resistivity was measured for three materials under test (aluminum alloy wires) each time using a four terminal method, and an average conductivity was calculated. The distance between the terminals was 200 mm. The conductivity is not particularly prescribed, but those greater than or equal to 40% IACS was regarded as a pass.

(E) Impact Absorption Energy

It is an index showing how much impact the aluminum alloy wire rod can withstand which is calculated by (potential energy of weight)/(cross sectional area of aluminum alloy wire rod) immediately before a wire break of the aluminum alloy wire rod. Specifically, a weight was attached to one end of the aluminum alloy wire rod wire and the weight was allowed to fall freely from a height of 300 mm. The weight was changed into a heavier weight sequentially, and the impact absorption energy was calculated from the weight immediately before a wire break. It can be said that the larger the impact absorption energy is, the higher the impact absorption. As for the impact absorption energy, 5 J/cm$^2$ or higher was regarded as a pass level.

(F) Number of Cycles to Fracture

As a reference of the bending fatigue resistance, a strain amplitude at an ordinary temperature is assumed as ±0.17%. The bending fatigue resistance varies depending on the strain amplitude. In a case where the strain amplitude is large, a fatigue life decreases, and in a case where the strain amplitude is small, the fatigue life increases. Since the strain amplitude can be determined by a wire size of the wire rod and a radius of curvature of a bending jig, a bending fatigue test can be carried out with the wire size of the wire rod and the radius of curvature of the bending jig being set arbitrarily. With a reversed bending fatigue tester manufactured by Fujii Seiki Co., Ltd. (existing company Fujii Co., Ltd.) and using a jig that can give a 0.17% bending strain, a repeated bending was carried out and a number of cycles to fracture was measured. In the present disclosure, number of cycles to fracture of 200,000 times or more was regarded as a pass.

(G) Number of Cycles to Fracture in a High Temperature Environment

The reversed bending fatigue tester described above was placed in a constant temperature tank at a temperature of 120° C., and a bending fatigue test was carried out on the aluminum alloy wire rods of Sample Nos. 4, 5, 6, 8, 9, 10, 13, 18 and 20 indicated in Table 1. As a reference of the bending fatigue resistance, a strain amplitude in a high temperature environment is assumed as ±0.17%.

TABLE 1-1

| | No. | COMPOSITION (MASS %) | | | | | | | | | | | | | | | |
|---|---|---|---|---|---|---|---|---|---|---|---|---|---|---|---|---|---|
| | | Mg | Si | Fe | Au | Ag | Cu | Cr | Mn | Zr | Ti | B | Hf | V | Sc | Co | Ni | Al |
| EXAMPLE | 1 | 0.34 | 0.34 | 0.20 | — | — | — | — | — | — | 0.010 | 0.003 | — | — | — | — | — | BALANCE |
| | 2 | 0.45 | 0.51 | 0.20 | — | — | 0.20 | — | — | — | 0.010 | 0.003 | — | — | — | — | — | |
| | 3 | 0.64 | 0.64 | 0.20 | — | — | — | 0.20 | — | — | 0.010 | 0.003 | — | — | — | — | — | |
| | 4 | 0.64 | 0.47 | 0.10 | — | — | — | — | — | 0.20 | 0.010 | 0.003 | — | — | — | — | — | |
| | 5 | 0.55 | 0.55 | 0.20 | — | — | — | — | — | 0.10 | 0.010 | 0.003 | — | — | — | — | — | |
| | 6 | 0.77 | 0.57 | 0.02 | — | — | 0.10 | 0.10 | — | — | 0.010 | 0.003 | — | — | — | — | — | |
| | 7 | 0.34 | 0.39 | 0.20 | — | — | 0.10 | — | 0.40 | — | 0.010 | 0.006 | — | — | — | — | — | |
| | 8 | 0.77 | 0.88 | 0.20 | — | — | 0.05 | — | — | 0.20 | 0.010 | 0.003 | — | — | — | — | — | |
| | 9 | 0.55 | 0.41 | 0.20 | — | — | — | 0.10 | 0.10 | — | 0.005 | 0.003 | — | — | — | — | — | |
| | 10 | 0.55 | 0.63 | 0.40 | — | — | — | 0.40 | — | 0.05 | 0.010 | 0.003 | — | — | — | — | — | |
| | 11 | 0.77 | 0.77 | 0.20 | — | — | — | — | 0.20 | 0.10 | 0.010 | 0.003 | — | — | — | — | — | |
| | 12 | 0.34 | 0.39 | 0.20 | — | — | 0.05 | 0.05 | 0.40 | — | 0.010 | 0.003 | — | — | — | — | — | |
| | 13 | 0.45 | 0.33 | 0.80 | — | — | — | 0.10 | 0.05 | 0.20 | 0.020 | 0.003 | — | — | — | — | — | |
| | 14 | 0.55 | 0.63 | 0.20 | — | — | 0.20 | — | 0.10 | 0.20 | 0.010 | 0.006 | — | — | — | — | — | |
| | 15 | 0.64 | 0.73 | 0.20 | — | — | 0.10 | 0.10 | — | 0.10 | 0.010 | 0.003 | — | — | — | — | — | |
| | 16 | 0.34 | 0.39 | 0.20 | — | — | — | 0.10 | — | — | — | — | — | — | — | — | — | |
| | 17 | 0.45 | 0.45 | 0.20 | — | — | — | — | 0.20 | — | — | — | — | — | — | — | — | |
| | 18 | 0.64 | 0.47 | 0.20 | 0.50 | — | — | — | — | — | 0.010 | 0.003 | — | — | — | — | — | |
| | 19 | 0.64 | 0.47 | 0.20 | 0.11 | — | — | — | — | 0.20 | 0.010 | 0.012 | — | — | — | — | — | |
| | 20 | 0.64 | 0.47 | 0.20 | — | 0.10 | — | — | — | — | 0.010 | 0.003 | — | — | — | — | — | |

N.B. NUMERICAL VALUES IN BOLD ITALIC IN THE TABLE ARE OUT OF APPROPRIATE RANGE OF THE EXAMPLE

TABLE 1-2

| | No. | COMPOSITION (MASS %) | | | | | | | | | | | | | | | |
|---|---|---|---|---|---|---|---|---|---|---|---|---|---|---|---|---|---|
| | | Mg | Si | Fe | Au | Ag | Cu | Cr | Mn | Zr | Ti | B | Hf | V | Sc | Co | Ni | Al |
| EXAMPLE | 21 | 0.64 | 0.47 | 0.20 | — | 0.20 | — | 0.20 | — | — | 0.010 | 0.003 | — | — | — | — | — | BALANCE |
| | 22 | 0.50 | 0.50 | 0.30 | — | — | 0.30 | 0.10 | 0.10 | 0.20 | 0.010 | 0.003 | — | — | — | — | — | |
| | 23 | 0.50 | 0.50 | 0.30 | 0.10 | — | 0.90 | — | — | — | 0.010 | 0.003 | — | — | — | — | — | |
| | 24 | 0.50 | 0.50 | 0.01 | — | 0.20 | 0.60 | 0.40 | 0.30 | — | 0.010 | 0.003 | — | — | — | — | — | |
| | 25 | 0.50 | 0.50 | 0.20 | — | — | — | 0.20 | 0.80 | 0.20 | 0.010 | 0.003 | — | — | — | — | — | |
| | 26 | 0.50 | 0.50 | 0.20 | — | — | — | 0.80 | — | 0.50 | 0.010 | 0.003 | — | — | — | — | — | |
| | 27 | 0.64 | 0.47 | 0.20 | — | — | — | — | — | — | 0.005 | 0.001 | 0.10 | — | — | — | — | |
| | 28 | 0.55 | 0.63 | 0.20 | — | — | — | — | — | — | 0.010 | — | 0.01 | 0.01 | — | — | — | |
| | 29 | 0.45 | 0.51 | 0.20 | — | — | — | — | — | — | 0.003 | — | — | 0.10 | — | — | — | |
| | 30 | 0.91 | 0.98 | 0.20 | — | — | — | 0.05 | — | — | 0.020 | 0.005 | — | — | — | — | — | |
| | 31 | 0.33 | 0.33 | 0.20 | — | — | 0.03 | — | — | — | 0.010 | 0.001 | — | — | — | — | — | |

TABLE 1-2-continued

| | No. | Mg | Si | Fe | Au | Ag | Cu | Cr | Mn | Zr | Ti | B | Hf | V | Sc | Co | Ni | Al |
|---|---|---|---|---|---|---|---|---|---|---|---|---|---|---|---|---|---|---|
| | 32 | 0.45 | 0.33 | 0.20 | — | — | 0.40 | — | — | — | 0.010 | 0.001 | — | — | — | — | — | |
| | 33 | 0.34 | 0.39 | 0.10 | — | — | — | — | — | — | 0.010 | 0.003 | — | — | — | 0.05 | — | |
| | 34 | 0.34 | 0.39 | 0.10 | — | — | — | — | — | — | 0.010 | 0.003 | — | — | — | — | — | |
| | 35 | 0.34 | 0.39 | 0.10 | — | — | — | — | — | — | — | — | — | — | — | — | — | |
| | 36 | 0.50 | 0.50 | 0.20 | — | — | — | — | — | — | 0.010 | 0.003 | 0.50 | — | — | — | — | |
| | 37 | 0.50 | 0.50 | 0.20 | — | — | — | — | — | — | 0.010 | 0.003 | 0.01 | 0.01 | — | — | — | |
| | 38 | 0.50 | 0.50 | 0.20 | — | — | — | — | — | — | 0.010 | 0.003 | — | — | 0.10 | — | — | |
| | 39 | 0.50 | 0.50 | 0.20 | — | — | — | — | — | — | 0.010 | 0.003 | — | — | — | — | 0.10 | |
| | 40 | 0.50 | 0.50 | 0.20 | — | — | — | — | — | — | 0.010 | 0.003 | — | — | 0.10 | — | 0.10 | |

N.B. NUMERICAL VALUES IN BOLD ITALIC IN THE TABLE ARE OUT OF APPROPRIATE RANGE OF THE EXAMPLE

TABLE 1-3

| | No. | Mg | Si | Fe | Au | Ag | Cu | Cr | Mn | Zr | Ti | B | Hf | V | Sc | Co | Ni | Al |
|---|---|---|---|---|---|---|---|---|---|---|---|---|---|---|---|---|---|---|
| EXAMPLE | 41 | 0.64 | 0.47 | 0.20 | — | — | — | — | — | — | 0.010 | 0.003 | — | 0.10 | 0.20 | — | — | BALANCE |
| | 42 | 0.64 | 0.47 | 0.20 | — | — | — | — | — | — | 0.010 | 0.003 | 0.10 | 0.20 | — | — | — | |
| | 43 | 0.64 | 0.47 | 0.20 | — | — | — | — | — | — | 0.010 | 0.003 | 0.20 | — | — | — | 0.10 | |
| | 44 | 0.64 | 0.47 | 0.20 | — | — | — | — | — | — | 0.010 | 0.003 | — | — | 0.01 | — | 0.01 | |
| | 45 | 0.64 | 0.47 | 0.20 | — | — | — | — | — | — | 0.010 | 0.003 | — | 0.01 | — | 0.20 | 0.50 | |
| | 46 | 0.55 | 0.63 | 0.20 | — | — | 0.20 | — | — | — | 0.010 | 0.003 | — | — | 0.10 | — | — | |
| | 47 | 0.55 | 0.63 | 0.20 | — | — | 0.20 | — | 0.10 | — | 0.010 | 0.003 | — | — | 0.10 | — | — | |
| | 48 | 0.55 | 0.63 | 0.20 | — | — | 0.20 | 0.05 | 0.05 | — | 0.010 | 0.003 | — | — | — | 0.10 | 0.10 | |
| | 49 | 0.55 | 0.63 | 0.20 | — | — | — | — | — | — | 0.010 | 0.003 | — | — | — | — | — | |
| | 50 | 0.55 | 0.63 | 0.20 | — | — | — | 0.25 | — | — | 0.010 | 0.003 | — | — | — | — | 0.10 | |
| | 51 | 0.50 | 0.50 | 0.20 | — | — | — | — | 0.20 | — | 0.010 | 0.003 | — | — | — | — | 0.10 | |
| | 52 | 0.50 | 0.50 | 0.20 | — | — | — | — | — | — | 0.010 | 0.003 | — | — | 0.40 | — | — | |
| | 53 | 0.50 | 0.50 | 0.20 | — | — | — | — | — | 0.10 | 0.010 | 0.003 | — | 0.44 | — | — | — | |
| | 54 | 0.64 | 0.73 | 1.00 | — | — | — | — | 0.10 | — | 0.010 | 0.003 | — | — | — | — | — | |
| | 55 | 0.64 | 0.73 | 1.20 | — | — | — | — | — | — | 0.010 | 0.003 | — | — | — | — | — | |
| | 56 | 0.64 | 0.73 | 1.40 | — | — | — | — | — | 0.10 | 0.010 | 0.003 | — | — | — | — | — | |
| | 57 | 1.00 | 1.00 | 0.20 | — | — | — | 0.10 | — | — | 0.010 | 0.003 | — | — | — | — | — | |

N.B. NUMERICAL VALUES IN BOLD ITALIC IN THE TABLE ARE OUT OF APPROPRIATE RANGE OF THE EXAMPLE

TABLE 2

| | No. | Mg | Si | Fe | Au | Ag | Cu | Cr | Mn | Zr | Ti | B | Hf | V | Sc | Co | Ni | Al |
|---|---|---|---|---|---|---|---|---|---|---|---|---|---|---|---|---|---|---|
| COM-PAR-ATIVE EX-AM-PLE | 1 | *1.20* | 0.39 | 0.20 | — | — | — | — | — | — | 0.010 | 0.003 | — | — | — | — | — | BALANCE |
| | 2 | *0.05* | 0.39 | 0.20 | — | — | — | — | — | — | 0.010 | 0.003 | — | — | — | — | — | |
| | 3 | 0.55 | *1.20* | 0.20 | — | — | — | — | 0.20 | — | 0.010 | 0.003 | — | — | — | — | — | |
| | 4 | 0.55 | *0.05* | 0.20 | — | — | — | — | 0.20 | — | 0.010 | 0.003 | — | — | — | — | — | |
| | 5 | 0.55 | 0.55 | *1.50* | — | — | — | — | — | — | 0.010 | 0.003 | — | — | — | — | — | |
| | 6 | 0.55 | 0.55 | 0.20 | *0.60* | — | — | — | — | — | 0.010 | 0.003 | — | — | *0.60* | — | — | |
| | 7 | 0.55 | 0.55 | 0.20 | — | — | — | — | *1.20* | — | 0.010 | 0.003 | — | — | — | — | — | |
| | 8 | 0.55 | 0.55 | 0.20 | — | — | — | *1.20* | — | — | 0.010 | 0.003 | — | — | — | — | — | |
| | 9 | 0.55 | 0.55 | 0.20 | — | — | — | — | — | *0.80* | 0.010 | 0.003 | — | *0.80* | — | — | — | |
| | 10 | 0.55 | 0.55 | 0.20 | — | — | — | — | — | — | *0.120* | *0.050* | — | — | — | — | — | |
| | 11 | *0.01* | *0.04* | 0.21 | — | — | — | — | — | — | 0.010 | 0.003 | — | — | — | — | — | |
| | 12 | 0.88 | 0.64 | 0.13 | — | — | — | — | 0.20 | — | 0.020 | 0.004 | — | — | — | — | — | |
| | 13 | 0.51 | 0.11 | 0.15 | — | — | — | — | — | 0.07 | 0.010 | 0.002 | — | — | — | — | — | |
| | 14 | 0.67 | 0.55 | 0.14 | — | — | — | — | — | — | 0.020 | 0.004 | — | — | — | — | — | |
| | 15 | 0.62 | 0.52 | 0.14 | — | — | — | — | 0.21 | — | 0.020 | 0.004 | — | — | — | — | — | |
| | 16 | 0.45 | 0.51 | 0.20 | — | — | — | — | — | 0.20 | 0.020 | 0.005 | — | — | — | — | — | |
| | 17 | 0.45 | 0.51 | 0.20 | — | — | — | — | 0.20 | — | 0.020 | 0.005 | — | — | — | — | — | |
| | 18 | 0.45 | 0.51 | 0.20 | — | — | 0.10 | 0.20 | — | — | 0.020 | 0.005 | — | — | — | — | — | |
| | 19 | 0.45 | 0.51 | 0.20 | — | 0.20 | — | — | — | — | 0.020 | 0.005 | — | — | — | — | — | |

N.B. NUMERAL VALUES IN BOLD ITALIC IN THE TABLE ARE OUT OF APPROPRIATE RANGE OF THE EXAMPLE

TABLE 3-1

| | | 1ST HEAT TREATMENT CONDITION | | | | SECOND HEAT TREATMENT CONDITION | | | | | AGING HEAT TREATMENT CONDITION | |
|---|---|---|---|---|---|---|---|---|---|---|---|---|
| | | | HEATING | | COOLING RATE | HEAT | HEATING | | COOLING RATE | | | |
| | No. | HEAT TREATMENT METHOD | TEMP. (° C.) | HEATING TIME | TO AT LEAST 150° C. (° C./s) | TREATMENT METHOD | TEMP. (° C.) | HEATING TIME | TO AT LEAST 150° C. (° C./s) | | TEMP. (° C.) | TIME (HOUR) |
| EXAMPLE | 1 | BATCH | 520 | 1 h | 30 | HIGH-FREQ. | 450 | 0.18 s | >=100 | | 160 | 5 |
| | 2 | HIGH-FREQ. | 550 | 0.18 s | >=100 | HIGH-FREQ. | 450 | 0.18 s | >=100 | | 180 | 5 |
| | 3 | HIGH-FREQ. | 600 | 0.09 s | >=100 | HIGH-FREQ. | 450 | 0.09 s | >=100 | | 200 | 5 |
| | 4 | HIGH-FREQ. | 550 | 0.18 s | >=100 | HIGH-FREQ. | 475 | 0.18 s | >=100 | | 200 | 10 |
| | 5 | HIGH-FREQ. | 520 | 0.72 s | >=100 | HIGH-FREQ. | 475 | 0.36 s | >=100 | | 180 | 10 |
| | 6 | CONDUCTION | 550 | 0.24 s | >=100 | CONDUCTION | 450 | 0.24 s | >=100 | | 160 | 10 |
| | 7 | CONDUCTION | 520 | 0.96 s | >=100 | CONDUCTION | 400 | 0.96 s | >=100 | | 140 | 15 |
| | 8 | CONDUCTION | 550 | 0.48 s | >=100 | CONDUCTION | 450 | 0.48 s | >=100 | | 180 | 15 |
| | 9 | CONDUCTION | 600 | 0.06 s | >=100 | CONDUCTION | 475 | 0.06 s | >=100 | | 180 | 15 |
| | 10 | RUNNING | 550 | 4.8 s | 70 | RUNNING | 400 | 4.8 s | 70 | | 200 | 5 |
| | 11 | RUNNING | 600 | 3.2 s | >=100 | RUNNING | 450 | 3.2 s | >=100 | | 220 | 10 |
| | 12 | BATCH | 520 | 3 h | 20 | CONDUCTION | 400 | 0.48 s | >=100 | | 180 | 10 |
| | 13 | BATCH | 550 | 3 h | 30 | CONDUCTION | 400 | 0.24 s | >=100 | | 160 | 10 |
| | 14 | BATCH | 600 | 3 h | 30 | CONDUCTION | 475 | 0.12 s | >=100 | | 160 | 15 |
| | 15 | CONDUCTION | 580 | 0.12 s | >=100 | CONDUCTION | 475 | 0.36 s | >=100 | | 160 | 5 |
| | 16 | HIGH-FREQ. | 550 | 0.18 s | >=100 | HIGH-FREQ. | 400 | 0.36 s | >=100 | | 180 | 1 |
| | 17 | HIGH-FREQ. | 520 | 0.36 s | >=100 | HIGH-FREQ. | 400 | 0.72 s | >=100 | | 160 | 1 |
| | 18 | BATCH | 550 | 5 h | 20 | HIGH-FREQ. | 450 | 0.72 s | >=100 | | 200 | 5 |
| | 19 | BATCH | 520 | 1 h | 20 | HIGH-FREQ. | 450 | 0.72 s | 140 | | 200 | 10 |
| | 20 | BATCH | 550 | 1 h | 15 | CONDUCTION | 400 | 0.48 s | >=100 | | 180 | 5 |

TABLE 3-1-continued

| | | REFERENCE LEVEL OF CONCENTRATION OF ADDED ELEMENTS IN PART OTHER THAN COMPOUND IN SECTIONAL STRUCTURE | DISTRIBUTION DENSITY OF Mg₂Si COMPOUND OF PARTICLE SIZE 0.5-5.0 nm (PARTICLES/μm²) | PERFORMANCE VALUATION | | | | |
|---|---|---|---|---|---|---|---|---|
| | No. | | | TENSILE STRENGTH (MPa) | ELONGATION AFTER FRACTURE (%) | CONDUCTIVITY (% IACS) | IMPACT ABSORBING ENERGY (J/mm²) | NUMBER OF CYCLES TO FRACTURE (×10⁴ CYCLES) |
| EXAMPLE | 1 | C | A | 150 | 14 | 54 | 7 | 23 |
| | 2 | B | A | 250 | 13 | 53 | 18 | 104 |
| | 3 | C | A | 288 | 8 | 45 | 14 | 162 |
| | 4 | B | A | 255 | 13 | 46 | 19 | 132 |
| | 5 | C | A | 315 | 8 | 52 | 16 | 141 |
| | 6 | B | A | 330 | 9 | 46 | 19 | 164 |
| | 7 | C | A | 155 | 19 | 44 | 19 | 60 |
| | 8 | B | A | 365 | 7 | 48 | 11 | 200 |
| | 9 | C | A | 250 | 13 | 48 | 17 | 96 |
| | 10 | C | A | 280 | 11 | 44 | 18 | 146 |
| | 11 | C | A | 300 | 9 | 43 | 19 | 184 |
| | 12 | C | A | 195 | 12 | 48 | 17 | 60 |
| | 13 | C | A | 170 | 12 | 47 | 11 | 57 |
| | 14 | C | A | 320 | 13 | 46 | 8 | 148 |
| | 15 | B | A | 322 | 9 | 44 | 27 | 176 |
| | 16 | B | A | 155 | 17 | 50 | 19 | 60 |
| | 17 | B | A | 180 | 15 | 46 | 10 | 82 |
| | 18 | C | A | 265 | 11 | 50 | 12 | 132 |
| | 19 | C | A | 265 | 16 | 41 | 25 | 132 |
| | 20 | C | A | 300 | 14 | 51 | 26 | 132 |

N.B. NUMERICAL VALUES IN BOLD ITALIC IN THE TABLE ARE OUT OF APPROPRIATE RANGE OF THE EXAMPLE

TABLE 3-2

| | | 1ST HEAT TREATMENT CONDITION | | | | SECOND HEAT TREATMENT CONDITION | | | | | AGING HEAT TREATMENT CONDITION | |
|---|---|---|---|---|---|---|---|---|---|---|---|---|
| | | | HEATING | | | | | HEATING | | | | |
| | No. | HEAT TREATMENT METHOD | TEMP. (° C.) | HEATING TIME | COOLING RATE TO AT LEAST 150° C. (° C./s) | HEAT TREATMENT METHOD | TEMP. (° C.) | HEATING TIME | COOLING RATE TO AT LEAST 150° C. (° C./s) | TEMP. (° C.) | TIME (HOUR) |
| EXAMPLE | 21 | BATCH | 600 | 1 h | 15 | CONDUCTION | 350 | 0.96 s | >=100 | 180 | 5 |
| | 22 | BATCH | 520 | 3 h | 15 | CONDUCTION | 400 | 0.48 s | >=100 | 180 | 2 |
| | 23 | BATCH | 550 | 1 h | 30 | RUNNING | 400 | 3.2 s | >=100 | 160 | 1 |
| | 24 | CONDUCTION | 520 | 1.3 s | >=100 | RUNNING | 300 | 15 s | 15 | 160 | 5 |
| | 25 | RUNNING | 580 | 2 s | 50 | RUNNING | 350 | 10 s | 30 | 160 | 3 |
| | 26 | RUNNING | 480 | 15 s | 20 | HIGH-FREQ. | 350 | 0.09 s | >=100 | 140 | 10 |
| | 27 | BATCH | 520 | 30 min | 30 | HIGH-FREQ. | 400 | 1 s | >=100 | 200 | 5 |
| | 28 | BATCH | 480 | 2 h | 11 | RUNNING | 350 | 4.8 s | 30 | 160 | 5 |
| | 29 | BATCH | 500 | 2 h | 11 | BATCH | 400 | 30 s | 15 | 200 | 1 |
| | 30 | BATCH | 580 | 2 h | 20 | HIGH-FREQ. | 475 | 0.18 s | >=100 | 180 | 10 |
| | 31 | RUNNING | 480 | 10 s | 70 | CONDUCTION | 350 | 1.3 s | >=100 | 160 | 1 |
| | 32 | CONDUCTION | 500 | 0.24 s | >=100 | HIGH-FREQ. | 475 | 0.18 s | >=100 | 140 | 1 |
| | 33 | HIGH-FREQ. | 550 | 0.72 s | >=100 | CONDUCTION | 400 | 0.24 s | >=100 | 180 | 15 |
| | 34 | RUNNING | 520 | 1 s | 90 | HIGH-FREQ. | 350 | 1.5 s | >=100 | 200 | 5 |
| | 35 | BATCH | 580 | 12 h | 11 | RUNNING | 300 | 1 s | 15 | 220 | 15 |
| | 36 | RUNNING | 620 | 0.5 s | 20 | BATCH | 350 | 30 s | 10 | 160 | 15 |
| | 37 | RUNNING | 480 | 1 s | 50 | RUNNING | 350 | 3.2 s | 50 | 180 | 10 |
| | 38 | RUNNING | 580 | 10 s | >=100 | CONDUCTION | 350 | 0.06 s | >=100 | 160 | 3 |
| | 39 | RUNNING | 500 | 20 s | 50 | RUNNING | 450 | 4.8 s | 30 | 160 | 10 |
| | 40 | HIGH-FREQ. | 550 | 0.03 s | >=100 | CONDUCTION | 400 | 0.12 s | >=100 | 180 | 1 |

TABLE 3-2-continued

|  | REFERENCE LEVEL OF CONCENTRATION OF ADDED ELEMENTS IN PART OTHER THAN COMPOUND IN SECTIONAL STRUCTURE | DISTRIBUTION DENSITY OF Mg$_2$Si COMPOUND OF PARTICLE SIZE 0.5-5.0 nm (PARTICLES/μm$^2$) | PERFORMANCE VALUATION | | | | |
|---|---|---|---|---|---|---|---|
|  |  |  | TENSILE STRENGTH (MPa) | ELONGATION AFTER FRACTURE (%) | CONDUCTIVITY (% IACS) | IMPACT ABSORBING ENERGY (J/mm$^2$) | NUMBER OF CYCLES TO FRACTURE (×10$^4$ CYCLES) |
| EXAMPLE 21 | C | A | 305 | 14 | 44 | 27 | 132 |
| 22 | C | A | 249 | 17 | 44 | 24 | 106 |
| 23 | C | A | 291 | 19 | 45 | 34 | 104 |
| 24 | C | A | 271 | 19 | 36 | 30 | 112 |
| 25 | C | A | 234 | 19 | 31 | 24 | 103 |
| 26 | C | A | 211 | 19 | 35 | 20 | 67 |
| 27 | C | A | 256 | 8 | 54 | 12 | 86 |
| 28 | C | A | 270 | 10 | 52 | 16 | 117 |
| 29 | C | A | 221 | 9 | 52 | 10 | 79 |
| 30 | C | A | 267 | 5 | 47 | 8 | 215 |
| 31 | C | A | 160 | 20 | 56 | 12 | 26 |
| 32 | C | A | 185 | 22 | 49 | 18 | 27 |
| 33 | C | A | 205 | 9 | 55 | 9 | 60 |
| 34 | A | A | 180 | 9 | 56 | 7 | 36 |
| 35 | A | A | 160 | 10 | 57 | 5 | 38 |
| 36 | C | A | 273 | 9 | 46 | 16 | 117 |
| 37 | C | A | 270 | 15 | 55 | 14 | 114 |
| 38 | A | A | 216 | 11 | 49 | 17 | 82 |
| 39 | C | A | 241 | 11 | 49 | 15 | 111 |
| 40 | C | A | 231 | 11 | 47 | 14 | 83 |

N.B. NUMERICAL VALUES IN BOLD ITALIC IN THE TABLE ARE OUT OF APPROPRIATE RANGE OF THE EXAMPLE

TABLE 3-3

| | | 1ST HEAT TREATMENT CONDITION | | | | SECOND HEAT TREATMENT CONDITION | | | | | AGING HEAT TREATMENT CONDITION | |
|---|---|---|---|---|---|---|---|---|---|---|---|---|
| | | | HEATING | | | | HEATING | | | | | |
| | No. | HEAT TREATMENT METHOD | TEMP. (° C.) | HEATING TIME | COOLING RATE TO AT LEAST 150° C. (° C./s) | HEAT TREATMENT METHOD | TEMP. (° C.) | HEATING TIME | COOLING RATE TO AT LEAST 150° C. (° C./s) | | TEMP. (° C.) | TIME (HOUR) |
| EXAMPLE | 41 | CONDUCTION | 550 | 0.03 s | >=100 | RUNNING | 400 | 3.2 s | >=100 | | 200 | 5 |
| | 42 | RUNNING | 580 | 4.8 s | 70 | RUNNING | 300 | 4.8 s | 50 | | 160 | 15 |
| | 43 | RUNNING | 480 | 3.2 s | >=100 | BATCH | 350 | 30 s | 9 | | 160 | 2 |
| | 44 | RUNNING | 520 | 3.2 s | 90 | RUNNING | 350 | 4.8 s | 25 | | 160 | 1 |
| | 45 | RUNNING | 520 | 4.8 s | >=100 | RUNNING | 350 | 10 s | 50 | | 140 | 3 |
| | 46 | RUNNING | 620 | 10 s | 41 | RUNNING | 475 | 0.5 s | 25 | | 180 | 15 |
| | 47 | HIGH-FREQ. | 580 | 1.5 s | >=100 | CONDUCTION | 350 | 0.03 s | >=100 | | 160 | 5 |
| | 48 | HIGH-FREQ. | 550 | 0.36 s | >=100 | RUNNING | 350 | 0.5 s | 15 | | 180 | 5 |
| | 49 | CONDUCTION | 480 | 0.96 s | >=100 | RUNNING | 400 | 1 s | 10 | | 160 | 10 |
| | 50 | CONDUCTION | 500 | 1.8 s | >=100 | RUNNING | 350 | 10 s | 50 | | 180 | 1 |
| | 51 | CONDUCTION | 520 | 1.3 s | >=100 | RUNNING | 400 | 20 s | >=100 | | 180 | 3 |
| | 52 | HIGH-FREQ. | 580 | 1 s | >=100 | HIGH-FREQ. | 400 | 0.36 s | >=100 | | 160 | 5 |
| | 53 | BATCH | 480 | 2 h | 30 | HIGH-FREQ. | 350 | 0.72 s | >=100 | | 200 | 10 |
| | 54 | RUNNING | 550 | 2 s | 70 | RUNNING | 300 | 2 s | 70 | | 160 | 1 |
| | 55 | CONDUCTION | 550 | 0.48 s | >=100 | RUNNING | 350 | 3.2 s | 90 | | 140 | 10 |
| | 56 | BATCH | 550 | 30 min | 15 | CONDUCTION | 400 | 0.48 s | >=100 | | 180 | 5 |
| | 57 | BATCH | 550 | 3 h | 11 | CONDUCTION | 400 | 0.24 s | >=100 | | 140 | 5 |

TABLE 3-3-continued

| | No. | REFERENCE LEVEL OF CONCENTRATION OF ADDED ELEMENTS IN PART OTHER THAN COMPOUND IN SECTIONAL STRUCTURE | DISTRIBUTION DENSITY OF Mg$_2$Si COMPOUND OF PARTICLE SIZE 0.5-5.0 nm (PARTICLES/μm$^2$) | PERFORMANCE VALUATION ||||| 
| | | | | TENSILE STRENGTH (MPa) | ELONGATION AFTER FRACTURE (%) | CONDUCTIVITY (% IACS) | IMPACT ABSORBING ENERGY (J/mm$^2$) | NUMBER OF CYCLES TO FRACTURE (×10$^3$ CYCLES) |
|---|---|---|---|---|---|---|---|---|
| EXAMPLE | 41 | C | A | 262 | 8 | 50 | 12 | 86 |
| | 42 | C | A | 307 | 9 | 46 | 17 | 135 |
| | 43 | C | A | 242 | 11 | 48 | 15 | 96 |
| | 44 | C | A | 230 | 18 | 49 | 22 | 66 |
| | 45 | A | A | 293 | 9 | 46 | 16 | 112 |
| | 46 | C | A | 331 | 9 | 49 | 19 | 150 |
| | 47 | C | A | 288 | 11 | 47 | 19 | 123 |
| | 48 | B | A | 332 | 8 | 49 | 17 | 153 |
| | 49 | C | A | 240 | 12 | 50 | 16 | 102 |
| | 50 | C | A | 303 | 8 | 46 | 15 | 123 |
| | 51 | C | A | 280 | 10 | 47 | 17 | 94 |
| | 52 | C | A | 212 | 9 | 52 | 10 | 56 |
| | 53 | C | A | 243 | 17 | 46 | 23 | 79 |
| | 54 | C | A | 272 | 16 | 48 | 26 | 125 |
| | 55 | B | A | 280 | 5 | 48 | 8 | 143 |
| | 56 | C | A | 353 | 5 | 50 | 12 | 179 |
| | 57 | C | A | 321 | 16 | 42 | 33 | 159 |

N.B. NUMERICAL VALUES IN BOLD ITALIC IN THE TABLE ARE OUT OF APPROPRIATE RANGE OF THE EXAMPLE

TABLE 4-1

| | | 1ST HEAT TREATMENT CONDITION | | | | SECOND HEAT TREATMENT CONDITION | | | | | AGING HEAT TREATMENT CONDITION | |
|---|---|---|---|---|---|---|---|---|---|---|---|---|
| | | HEAT TREATMENT METHOD | HEATING TEMP. (°C) | HEATING TIME | COOLING RATE TO AT LEAST 150 (°C/s) | HEAT TREATMENT METHOD | HEATING TEMP. (°C) | HEATING TIME | COOLING RATE TO AT LEAST 150 (°C/s) | | TEMP. (°C) | TIME (HOUR) |
| | No. | | | | | | | | | | | |
| COMPARATIVE EXAMPLE | 1 | BATCH | 550 | 1 h | 15 | CONDUCTION | 400 | 0.48 s | >=100 | | 160 | 5 |
| | 2 | BATCH | 550 | 1 h | 15 | CONDUCTION | 400 | 0.48 s | >=100 | | 160 | 5 |
| | 3 | BATCH | 550 | 1 h | 15 | CONDUCTION | 400 | 0.48 s | >=100 | | 160 | 5 |
| | 4 | BATCH | 550 | 1 h | 15 | CONDUCTION | 400 | 0.48 s | >=100 | | 160 | 5 |
| | 5 | | | | | WIRE BREAK DURING DRAWING | | | | | | |
| | 6 | | | | | WIRE BREAK DURING DRAWING | | | | | | |
| | 7 | | | | | WIRE BREAK DURING DRAWING | | | | | | |
| | 8 | | | | | WIRE BREAK DURING DRAWING | | | | | | |
| | 9 | | | | | WIRE BREAK DURING DRAWING | | | | | | |
| | 10 | BATCH | 550 | 1 h | 15 | CONDUCTION | 400 | 0.48 s | >=100 | | 160 | 5 |

| | | | PERFORMANCE VALUATION | | | | | |
|---|---|---|---|---|---|---|---|---|
| | No. | REFERENCE LEVEL OF CONCENTRATION OF ADDED ELEMENTS IN PART OTHER THAN COMPOUND IN SECTIONAL STRUCTURE | DISTRIBUTION DENSITY OF Mg₂Si COMPOUND OF PARTICLE SIZE 0.5-5.0 mm (PARTICLES/μm²) | TENSILE STRENGHT (MPa) | ELONGATION AFTER FRACTURE (%) | CONDUCTIVITY (% IACS) | IMPACT ABSORBING ENERGY (J/mm²) | NUMBER OF CYCLES TO FRACTURE (×10⁴ CYCLES) |
| COMPARATIVE EXAMPLE | 1 | B | A | 160 | 3 | 45 | 2 | 16 |
| | 2 | B | A | 105 | 18 | 58 | 2 | 5 |
| | 3 | C | A | 250 | 3 | 42 | 4 | 15 |
| | 4 | C | A | 120 | 16 | 55 | 4 | 6 |
| | 5 | — | — | — | — | — | — | — |
| | 6 | — | — | — | — | — | — | — |
| | 7 | — | — | — | — | — | — | — |
| | 8 | — | — | — | — | — | — | — |
| | 9 | — | — | — | — | — | — | — |
| | 10 | B | A | 265 | 3 | 26 | 5 | 16 |

N.B. NUMERICAL VALUES IN BOLD ITALIC IN THE TABLE ARE OUT OF APPROPRIATE RANGE OF THE EXAMPLE

TABLE 4-2

| | | 1ST HEAT TREATMENT CONDITION | | | | SECOND HEAT TREATMENT CONDITION | | | | | AGING HEAT TREATMENT CONDITION | |
|---|---|---|---|---|---|---|---|---|---|---|---|---|
| | | HEAT TREATMENT METHOD | HEATING TEMP (°C.) | HEATING TIME | COOLING RATE TO AT LEAST 150 (°C./s) | HEAT TREATMENT METHOD | HEATING TEMP (°C.) | HEATING TIME | COOLING RATE TO AT LEAST 150 (°C./s) | | TEMP. (°C.) | TIME (HOUR) |
| | No. | | | | | | | | | | | |
| COMPARATIVE EXAMPLE | 11 | BATCH | 550 | 1 h | 15 | CONDUCTION | 400 | 0.48 s | >=100 | | 160 | 5 |
| | 12 | BATCH | *300* | 3 h | FURNACE COOL (LESS THAN 11° C./s) | BATCH | *530* | 3 h | 11 | | 160 | 8 |
| | 13 | BATCH | *300* | 3 h | FURNACE COOL (LESS THAN 11° C./s) | HIGH-FREQ. | *600* | 0.5 s | *8* | | 160 | 12 |
| | 14 | BATCH | *300* | 3 h | FURNACE COOL (LESS THAN 11° C./s) | CONDUCTION | *600* | 0.48 s | *8* | | 160 | 12 |
| | 15 | BATCH | *300* | 3 h | FURNACE COOL (LESS THAN 11° C./s) | RUNNING | *600* | 30 s | *8* | | 160 | 12 |
| | 16 | CONDUCTION | *300* | 0.48 s | >=100 | BATCH | 400 | 30 s | 15 | | 180 | 1 |
| | 17 | BATCH | 520 | 3 h | FURNACE COOL (LESS THAN 11° C./s) | RUNNING | 400 | 4.8 s | >=100 | | 180 | 1 |
| | 18 | HIGH-FREQ. | 520 | 0.96 s | >=100 | BATCH | *550* | 30 s | 15 | | 180 | 1 |
| | 19 | RUNNING | 550 | 10 s | >=100 | BATCH | 400 | 30 s | *4* | | 180 | 1 |

TABLE 4-2-continued

| | No. | REFERENCE LEVEL OF CONCENTRATION OF ADDED ELEMENTS IN PART OTHER THAN COMPOUND IN SECTIONAL STRUCTURE | DISTRIBUTION DENSITY OF Mg$_2$Si COMPOUND OF PARTICLE SIZE 0.5-5.0 mm (PARTICLES/μm$^2$) | PERFORMANCE VALUATION ||||| 
|---|---|---|---|---|---|---|---|---|
| | | | | TENSILE STRENGHT (MPa) | ELONGATION AFTER FRACTURE (%) | CONDUCTIVITY (% IACS) | IMPACT ABSORBING ENERGY (J/mm$^2$) | NUMBER OF CYCLES TO FRACTURE (×10$^4$ CYCLES) |
| COMPARATIVE EXAMPLE | 11 | C | A | 95 | 28 | 63 | 3 | 5 |
| | 12 | *D* | A | 180 | 4 | 46 | 1 | 11 |
| | 13 | *D* | A | 190 | 4 | 51 | 2 | 9 |
| | 14 | *D* | A | 230 | 3 | 49 | 2 | 8 |
| | 15 | *D* | A | 290 | 3 | 47 | 2 | 12 |
| | 16 | B | *B* | 123 | 17 | 56 | 5 | 11 |
| | 17 | B | *B* | 120 | 17 | 57 | 4 | 11 |
| | 18 | *D* | A | 165 | 2 | 52 | 1 | 8 |
| | 19 | B | *B* | 119 | 15 | 59 | 4 | 10 |

N.B. NUMERICAL VALUES IN BOLD ITALIC IN THE TABLE ARE OUT OF APPROPRIATE RANGE OF THE EXAMPLE

TABLE 5

| | No. | NUMBER OF CYCLES TO FRACTURE (×10^4 CYCLES) |
|---|---|---|
| REFERENCE EXAMPLE | 4 | 18 |
| | 5 | 18 |
| | 6 | 19 |
| | 8 | 19 |
| | 9 | 15 |
| | 10 | 17 |
| EXAMPLE | 13 | 40 |
| | 18 | 63 |
| | 20 | 58 |

The following is elucidated from the results indicated in Tables 3-1, 3-2, 3-3, 4-1 and 4-2. Each of the aluminum alloy wires of Examples 1 to 57 had a tensile strength, elongation and conductivity at equivalent levels to those of the related art (aluminum alloy wire disclosed in Japanese Laid-Open Patent Publication No. 2012-229485, corresponds to Comparative Example 12), and had improved impact resistance and flex fatigue resistance. In contrast, each of the aluminum alloy wires of Comparative Examples 1 to 19 has a small number of cycles to fracture of 180,000 times or less, and had a reduced flex fatigue resistance. Those other than Comparative Examples 10 and 16 had a reduced impact resistance as well. Also, each of the Comparative Examples 5 to 9 broke during a wire drawing step. Each of the aluminum alloy wires of Comparative Examples 12 to 15 and 18 that has a chemical composition within the range of the present disclosure, but the concentrations of Mg and Si other than compounds in a sectional structure exceeds 2.00 mass %, respectively, which are out of an appropriate range of the present disclosure each had a reduced flex fatigue resistance and impact resistance.

As can be seen from the results of the bending fatigue test in a high temperature environment are indicated in Table 5, each of the aluminum alloy wire rods of Sample Nos. 13, 18 and 20, which has a composition in which a Mg/Si ratio is greater than 1 and Zr is an essential component, shows a number of cycles to fracture of between 400,000 and 630,000 cycles, and thus has an excellent bending fatigue resistance in a high temperature environment. Whereas, each of the aluminum alloy wire rods of Sample Nos. 4, 5, 6, 8, 9 and 10, which are indicated as reference examples, does not have a composition in which a Mg/Si ratio is greater than 1 and Zr is an essential component. Each of the aluminum alloy wire rods of Sample Nos. 4, 5, 6, 8, 9 and 10 shows a number of cycles to fracture of between 150,000 and 190,000 cycles, and a rate of decrease in the number of cycles to fracture for the bending fatigue test in a high temperature environment against the number of cycles to fracture for the bending fatigue test at an ordinary temperature was greater than rate of decrease for Examples 13, 18 and 20.

The aluminum alloy wire rod of the present disclosure is based on a prerequisite to use an aluminum alloy containing Mg and Si, and by suppressing the segregation (e.g., segregation within a crystal grain or segregation at a grain boundary) at which a difference in concentration for each of added elements within a crystal grain or at grain boundaries in a parent phase occur due to added elements which are mainly a Mg component and a Si component, and particularly when used as an extra fine wire having a strand diameter of less than or equal to 0.5 mm, an aluminum alloy wire rod used as a conductor of an electric wiring structure, an aluminum alloy stranded wire, a coated wire, a wire harness, and a method of manufacturing an aluminum alloy wire rod can be provided with an improved impact resistance, bending fatigue resistance and at an ordinary temperature and further with an improved bending fatigue resistance in a high temperature environment, while ensuring strength, elongation and conductivity equivalent to those of a product of the related art (aluminum alloy wire disclosed in Japanese Laid-Open Patent Publication No. 2012-229485), and thus it is useful as a conducting wire for a motor, a battery cable, or a harness equipped on a transportation vehicle, and as a wiring structure of an industrial robot. Particularly, since the aluminum alloy wire rod of the present disclosure has a high tensile strength, a wire size thereof can be made smaller than that of the wire of the related art, and it can be appropriately used for a door, a trunk or a hood requiring a high impact resistance and bending fatigue resistance.

What is claimed is:

1. An aluminum alloy wire rod having a composition comprising 0.1 mass % to 1.0 mass % Mg; 0.1 mass % to 1.0 mass % Si; 0.01 mass % to 1.40 mass % Fe; 0.01 mass % to 0.50 mass % Zr; 0.000 mass % to 0.100 mass % Ti; 0.000 mass % to 0.030 mass % B; 0.00 mass % to 1.00 mass % Cu; 0.00 mass % to 0.50 mass % Ag; 0.00 mass % to 0.50 mass % Au; 0.00 mass % to 1.00 mass % Mn; 0.00 mass % to 1.00 mass % Cr; 0.00 mass % to 0.50 mass % Hf; 0.00 mass % to 0.50 mass % V; 0.00 mass % to 0.50 mass % Sc; 0.00 mass % to 0.50 mass % Co; and 0.00 mass % to 0.50 mass % Ni, a Mg/Si ratio being greater than 1,
   wherein a dispersion density of an $Mg_2Si$ compound having a particle size of 0.5 μm to 5.0 μm is less than or equal to $3.0 \times 10^{-3}$ particles/μm², and
   in a sectional structure, a concentration of each of Mg and Si other than a compound is less than or equal to 2.00 mass %.

2. The aluminum alloy wire rod according to claim 1, wherein in the sectional structure, a concentration of each of Fe, Ti, B, Cu, Ag, Au, Mn, Cr, Zr, Hf, V, Sc, Co and Ni other than a compound is less than or equal to 1.00 mass %.

3. The aluminum alloy wire rod according to claim 1, wherein in the sectional structure, a concentration of each of Mg, Si, Fe, Ti, B, Cu, Ag, Au, Mn, Cr, Zr, Hf, V, Sc, Co and Ni other than a compound is less than or equal to 1.00 mass %.

4. The aluminum alloy wire rod according to claim 1, wherein the composition contains one or two element(s) selected from a group consisting of 0.001 mass % to 0.100 mass % Ti; and 0.001 mass % to 0.030 mass % B.

5. The aluminum alloy wire rod according to claim 1, wherein the composition contains one or more element(s) selected from a group consisting of 0.01 mass % to 1.00 mass % Cu; 0.01 mass % to 0.50 mass % Ag; 0.01 mass % to 0.50 mass % Au; 0.01 mass % to 1.00 mass % Mn; 0.01 mass % to 1.00 mass % Cr; 0.01 mass % to 0.50 mass % Hf; 0.01 mass % to 0.50 mass % V; 0.01 mass % to 0.50 mass % Sc; 0.01 mass % to 0.50 mass % Co; and 0.01 mass % to 0.50 mass % Ni.

6. The aluminum alloy wire rod according to claim 1, wherein the composition has a sum of contents of Fe, Ti, B, Cu, Ag, Au, Mn, Cr, Zr, Hf, V, Sc, Co, and Ni of 0.02 mass % to 2.00 mass %.

7. The aluminum alloy wire rod according to claim 1, wherein an impact absorption energy is greater than or equal to 5 J/mm².

8. The aluminum alloy wire rod according to claim 1, wherein number of cycles to fracture measured in a bending fatigue test at an ordinary temperature is greater than or equal to 200,000 cycles.

9. The aluminum alloy wire rod according to claim 1, wherein number of cycles to fracture measured in a bending fatigue test in a constant temperature tank at a temperature of 120° C. is 400,000 cycles to 630,000 cycles.

10. The aluminum alloy wire rod according to claim 1, wherein the aluminum alloy wire rod is an aluminum alloy wire having a diameter of 0.1 mm to 0.5 mm.

11. An aluminum alloy stranded wire comprising a plurality of aluminum alloy wire rods as claimed in claim 10 which are stranded together.

12. A coated wire comprising a coating layer at an outer periphery of the aluminum alloy wire rod as claimed in claim 10.

13. A coated wire comprising a coating layer at an outer periphery of the aluminum alloy stranded wire as claimed in claim 11.

14. A wire harness comprising:
- a coated wire including a coating layer at an outer periphery of one of an aluminum alloy wire rod and an aluminum alloy stranded wire, the aluminum alloy stranded wire comprising a plurality of the aluminum alloy wire rods which are stranded together; and
- a terminal fitted at an end portion of the coated wire, the coating layer being removed from the end portion,
- the aluminum alloy wire rod having a composition comprising 0.1 mass % to 1.0 mass % Mg, 0.1 mass % to 1.0 mass % Si; 0.01 mass % to 1.40 mass % Fe; 0.01 mass % to 0.50 mass % Zr; 0.000 mass % to 0.100 mass % Ti; 0.000 mass % to 0.030 mass % B; 0.00 mass % to 1.00 mass % Cu; 0.00 mass % to 0.50 mass % Ag; 0.00 mass % to 0.50 mass % Au; 0.00 mass % to 1.00 mass % Mn; 0.00 mass % to 1.00 mass % Cr; 0.00 mass % to 0.50 mass % Hf; 0.00 mass % to 0.50 mass % V; 0.00 mass % to 0.50 mass % Sc; 0.00 mass % to 0.50 mass % Co; and 0.00 mass % to 0.50 mass % Ni, a Mg/Si ratio being greater than 1,
wherein
- a dispersion density of an $Mg_2Si$ compound having a particle size of 0.5 μm to 5.0 μm is less than or equal to $3.0 \times 10^{-3}$ particles/μm², and
- in a sectional structure, a concentration of each of Mg and Si other than a compound is less than or equal to 2.00 mass %.

15. A method of manufacturing an aluminum alloy wire rod as claimed in claim 1, the aluminum alloy wire rod being obtained by forming a drawing stock through hot working subsequent to melting and casting, and thereafter carrying out processes including a first wire drawing process, a first heat treatment process, a second wire drawing process, a second heat treatment process and an aging heat treatment process in this order,
- wherein the first heat treatment process includes, after heating to a predetermined temperature within a range of 480° C. to 620° C., cooling at an average cooling rate of greater than or equal to 10° C./s at least to a temperature of 150° C., and
- the second heat treatment includes, after heating to a predetermined temperature within a range of higher than or equal to 300° C. and lower than 480° C. for less than two minutes, cooling at an average cooling rate of greater than or equal to 9° C./s at least to a temperature of 150° C.

* * * * *